(12) United States Patent
Lay et al.

(10) Patent No.: US 10,078,346 B2
(45) Date of Patent: Sep. 18, 2018

(54) MAGNETIC MOUNTING SYSTEM FOR ELECTRONIC DEVICE

(71) Applicant: OTTER PRODUCTS, LLC, Fort Collins, CO (US)

(72) Inventors: Carlton R. Lay, Fort Collins, CO (US); Cameron D. Magness, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 940 days.

(21) Appl. No.: 14/493,314

(22) Filed: Sep. 22, 2014

(65) Prior Publication Data

US 2015/0083615 A1    Mar. 26, 2015

Related U.S. Application Data

(60) Provisional application No. 61/880,846, filed on Sep. 21, 2013, provisional application No. 61/896,423, filed on Oct. 28, 2013.

(51) Int. Cl.
| | |
|---|---|
| *G06F 1/16* | (2006.01) |
| *F16M 11/04* | (2006.01) |
| *F16M 11/38* | (2006.01) |
| *F16M 13/00* | (2006.01) |
| *F16M 13/02* | (2006.01) |

(Continued)

(52) U.S. Cl.
CPC ......... *G06F 1/1616* (2013.01); *F16M 11/041* (2013.01); *F16M 11/105* (2013.01); *F16M 11/2021* (2013.01); *F16M 11/38* (2013.01); *F16M 13/00* (2013.01); *F16M 13/022* (2013.01); *G06F 1/1632* (2013.01); *H04M 1/04* (2013.01); *G06F 2200/1633* (2013.01); *H04M 1/185* (2013.01)

(58) Field of Classification Search
CPC ............... G06F 1/1616; G06F 1/632; G06F 2200/1633; H04M 1/04; H04M 1/185; F16M 11/2021; F16M 11/105; F16M 11/38; F16M 11/041; F16M 13/022; F16M 13/00
USPC ...................................... 206/45.24
See application file for complete search history.

(56) References Cited

U.S. PATENT DOCUMENTS

| | | |
|---|---|---|
| 3,480,310 A | 11/1969 | Mcelwain |
| 3,521,216 A | 7/1970 | Tolegian |

(Continued)

FOREIGN PATENT DOCUMENTS

FR    935529 A    6/1948

*Primary Examiner* — Ernesto Grano

(57) ABSTRACT

An electronic device, such as a tablet computer, smartphone, or television, can be mounted to a surface using a magnetic mounting apparatus. In one example, the apparatus can include a protective case that is adapted to receive an electronic device. The protective case can be configured to protect the electronic device from drop-induced damage. The protective case can include a female mounting portion disposed in the protective case. The female mounting portion of the protective case can be configured to magnetically mount to a male mounting portion associated with a folding cover, surface mount, or dock. Once magnetically mounted to the folding cover, surface mount, or dock, the protective case can rotate about the female mounting portion to allow the electronic device to be transitioned from a landscape mode to a portrait mode and vice versa.

20 Claims, 23 Drawing Sheets

(51) Int. Cl.
*F16M 11/10* (2006.01)
*F16M 11/20* (2006.01)
*H04M 1/04* (2006.01)
*H04M 1/18* (2006.01)

(56) References Cited

U.S. PATENT DOCUMENTS

| | | |
|---|---|---|
| 3,786,391 A | 1/1974 | Mathauser |
| 3,808,577 A | 4/1974 | Mathauser |
| 3,810,258 A | 5/1974 | Mathauser |
| 3,816,679 A | 6/1974 | Hotchkiss |
| 4,182,558 A | 1/1980 | Matsuo |
| 4,431,333 A | 2/1984 | Chandler |
| 4,859,110 A | 8/1989 | Dommel |
| 4,940,414 A | 7/1990 | Lee |
| 4,963,902 A | 10/1990 | Fukahori |
| 4,994,829 A | 2/1991 | Tsukamoto |
| 5,054,733 A | 10/1991 | Shields |
| 5,359,756 A | 11/1994 | Miyauchi et al. |
| 5,664,292 A | 9/1997 | Chen |
| 5,992,807 A | 11/1999 | Tarulli |
| 5,996,956 A | 12/1999 | Shawver |
| 6,135,408 A | 10/2000 | Richter |
| 6,149,116 A | 11/2000 | Won |
| 6,302,617 B1 | 10/2001 | Rumpp |
| 6,305,588 B1 | 10/2001 | Michel et al. |
| 6,305,656 B1 | 10/2001 | Wemyss |
| 6,409,531 B1 | 6/2002 | Millard |
| 6,464,524 B1 | 10/2002 | Kerr et al. |
| 6,514,624 B2 | 2/2003 | Takemoto |
| 6,646,864 B2 | 11/2003 | Richardson |
| 6,685,493 B2 | 2/2004 | Birkenmaier et al. |
| 6,705,580 B1 | 3/2004 | Bain |
| 6,888,940 B1 | 5/2005 | Deppen |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,287,738 B2 | 10/2007 | Pitlor |
| 7,311,526 B2 | 12/2007 | Rohrbach et al. |
| 7,374,142 B2 | 5/2008 | Carnevali |
| 7,431,251 B2 | 10/2008 | Carnevali |
| 7,575,389 B2 | 8/2009 | Nance |
| 7,871,218 B2 | 1/2011 | Frey et al. |
| 8,303,336 B2 | 11/2012 | Smith |
| 8,453,835 B2 | 6/2013 | So |
| 8,567,599 B2 | 10/2013 | Beatty et al. |
| 8,608,502 B2 | 12/2013 | Witter et al. |
| 8,646,739 B2 | 2/2014 | Moyer |
| 8,706,175 B2 | 4/2014 | Cho |
| 8,770,402 B2 | 7/2014 | Bergreen et al. |
| 8,875,879 B2 * | 11/2014 | Diebel .................. A45C 11/00 206/320 |
| 8,955,678 B2 | 2/2015 | Murphy et al. |
| 9,397,719 B1 * | 7/2016 | Schmidt ................ F16M 11/24 |
| 9,765,921 B2 * | 9/2017 | Vogel .................... F16M 11/14 |
| 9,800,283 B2 * | 10/2017 | Schmidt ................ H04B 1/3877 |
| 9,871,550 B2 * | 1/2018 | Witter .................. H04B 1/3888 |
| 9,913,388 B1 * | 3/2018 | McHatet .............. H05K 5/0204 |
| 2001/0000617 A1 * | 5/2001 | Tracy ...................... B60N 3/10 248/154 |
| 2003/0141329 A1 | 7/2003 | Huang |
| 2004/0029405 A1 * | 2/2004 | Neidlein ............ H01R 13/6205 439/38 |
| 2006/0086873 A1 * | 4/2006 | Chen ...................... B60R 11/02 248/206.5 |
| 2007/0215659 A1 * | 9/2007 | Knapp .................... A45F 5/02 224/269 |
| 2007/0215769 A1 | 9/2007 | Nebeker et al. |
| 2008/0199252 A1 | 8/2008 | Frey et al. |
| 2009/0084705 A1 * | 4/2009 | Justiss ...................... A45F 5/02 206/724 |
| 2010/0078343 A1 | 4/2010 | Hoellwarth et al. |
| 2010/0203931 A1 * | 8/2010 | Hynecek ................ A45C 11/00 455/575.8 |
| 2011/0073505 A1 | 3/2011 | Stiehl |
| 2011/0073608 A1 | 3/2011 | Richardson et al. |
| 2011/0297566 A1 | 12/2011 | Gallagher et al. |
| 2011/0314651 A1 | 12/2011 | Behar et al. |
| 2012/0043235 A1 | 2/2012 | Klement |
| 2012/0074005 A1 | 3/2012 | Johnson et al. |
| 2012/0092377 A1 | 4/2012 | Stein |
| 2012/0111881 A1 * | 5/2012 | Gaddis, II ............. G06F 1/1628 220/752 |
| 2012/0175474 A1 | 7/2012 | Barnard et al. |
| 2012/0187260 A1 | 7/2012 | Moyer |
| 2012/0252543 A1 | 10/2012 | Cho |
| 2012/0267491 A1 * | 10/2012 | Chiu ...................... F16M 11/041 248/221.11 |
| 2012/0325702 A1 | 12/2012 | Gallagher et al. |
| 2012/0326003 A1 | 12/2012 | Solow et al. |
| 2013/0068915 A1 | 3/2013 | Yang |
| 2013/0181584 A1 * | 7/2013 | Whitten ................ G06F 1/1656 312/223.1 |
| 2013/0303000 A1 * | 11/2013 | Witter .................. H01R 13/6205 439/39 |
| 2014/0265765 A1 * | 9/2014 | Khodapanah .......... F16M 13/02 312/223.1 |
| 2014/0325818 A1 * | 11/2014 | Mayfield ............... F16M 11/041 29/428 |
| 2014/0355200 A1 * | 12/2014 | Thiers .................... H04W 88/02 361/679.41 |
| 2015/0153791 A1 * | 6/2015 | Wong ........................ G06F 1/20 361/679.54 |
| 2016/0040825 A1 * | 2/2016 | Franklin ................ F16M 13/02 439/39 |
| 2016/0373152 A1 * | 12/2016 | Schmidt ................ H04B 1/3877 |

* cited by examiner

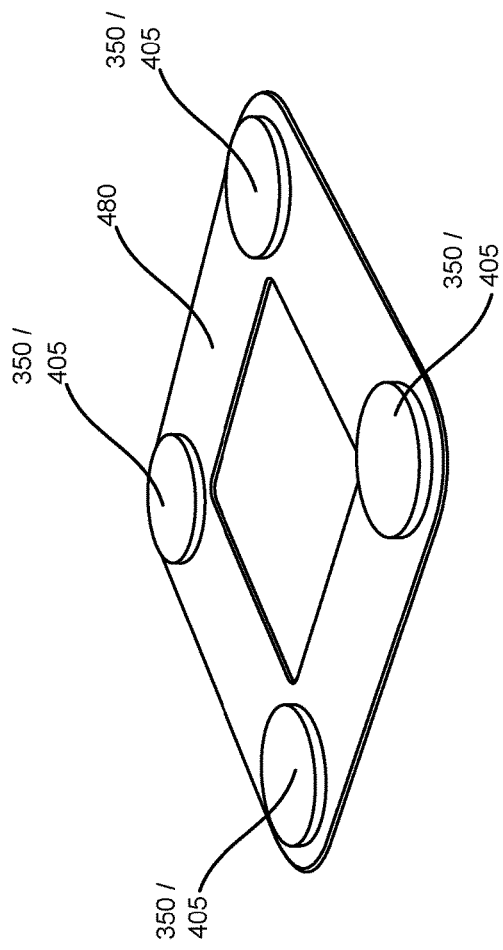
FIG. 43
FIG. 44

MAGNETIC MOUNTING SYSTEM FOR ELECTRONIC DEVICE

CROSS REFERENCE TO RELATED APPLICATIONS

This application claims priority to U.S. Provisional Application No. 61/880,846, filed Sep. 21, 2013 and U.S. Provisional Application No. 61/896,423, filed Oct. 28, 2013.

BACKGROUND

Electronic devices, such as tablet computers, portable media players, personal computers, e-readers, smartphones, and audio players are becoming an increasingly important part of peoples' lives. People rely on electronic devices to communicate with others, engage in commerce, listen to music, watch videos, and manage personal calendars, just to name a few. To allow people to more easily interact with their electronic devices, it can be desirable to develop new ways to mount and display these devices. Also, due to the high cost of electronic devices, it is desirable to protect these devices from physical damage resulting from, for example, accidental drops.

BRIEF DESCRIPTIONS OF DRAWINGS

FIG. 43 shows a plurality of magnets and a ferrous metal member arranged in a configuration suitable for inclusion in the folding covers of FIG. 4 or 14, the dock of FIG. 31, or the surface mount of FIG. 36.

FIG. 44 shows a side view of non-symmetrical magnetic fields generated by the arrangement of the magnets and ferrous metal member of FIG. 43.

DETAILED DESCRIPTION

Figure 1:
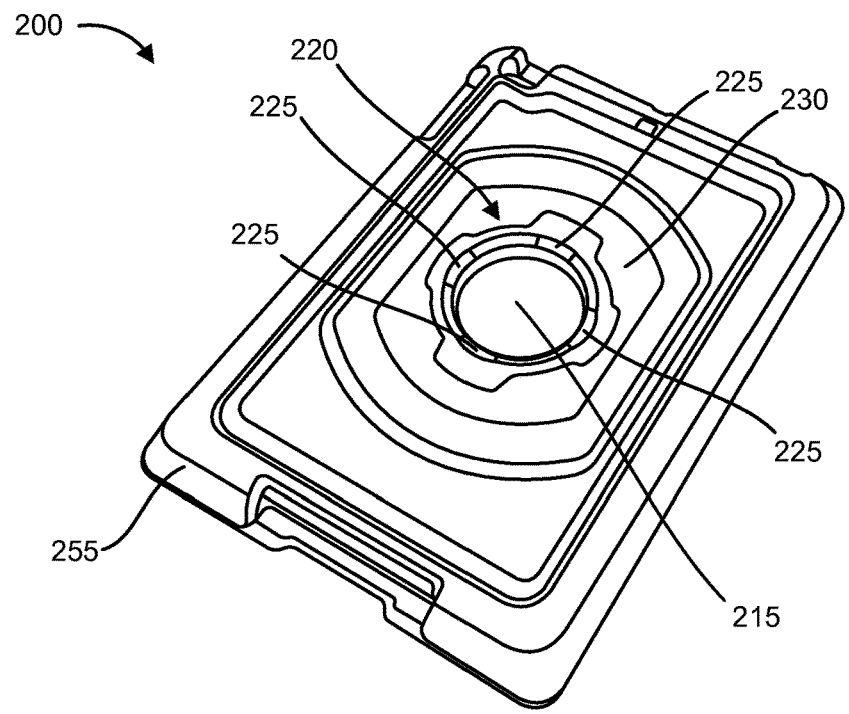
FIG. 1 shows a rear perspective view of a protective case for an electronic device, the protective case adapted to receive and house the electronic device.

A magnetic mounting system is described herein for mounting a portable electronic device 100, such as a laptop computer, smartphone, or tablet computer, to a surface while allowing the electronic device 100 to be rotated relative to the surface while remaining in a mounted relationship with the surface. The magnetic mounting system can include a plurality of compatible components, one of which is a protective case 200. The protective case 200 can be adapted receive and house the electronic device and to magnetically mount to a variety of other compatible components, such as a folding cover 300, a surface mount 400, or a dock 500, to allow the electronic device to be displayed in a variety of useful orientations. The protective case 200 can magnetically mount to any of the compatible components described herein.

Figure 2:
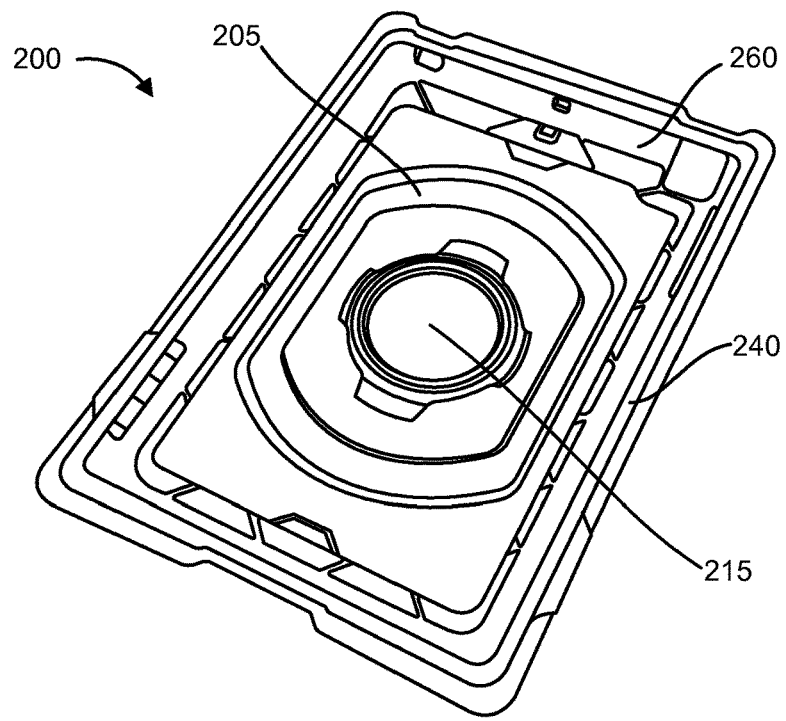
FIG. 2 shows a front perspective view of the protective case of FIG. 1.

FIG. 1 shows a rear perspective view of the protective case 200, and FIG. 2 shows a front perspective view of the protective case. The protective case 200 can be adapted to receive and house an electronic device 100. The protective case 200 can be a protective shell that protects the electronic device 100 from drop-induced damage. The protective case 200 can be configured to cover a portion of the electronic device 100 and thereby protect the device from scratches and other forms of wear. In these examples, the protective case 200 can cover a majority of a rear surface 110 of the electronic device 100 as well as four corners and four side surfaces of the electronic device. In other examples, the protective case 200 may cover more or less external surface area of the electronic device 100 to provide more or less protection, respectively.

Figure 3:
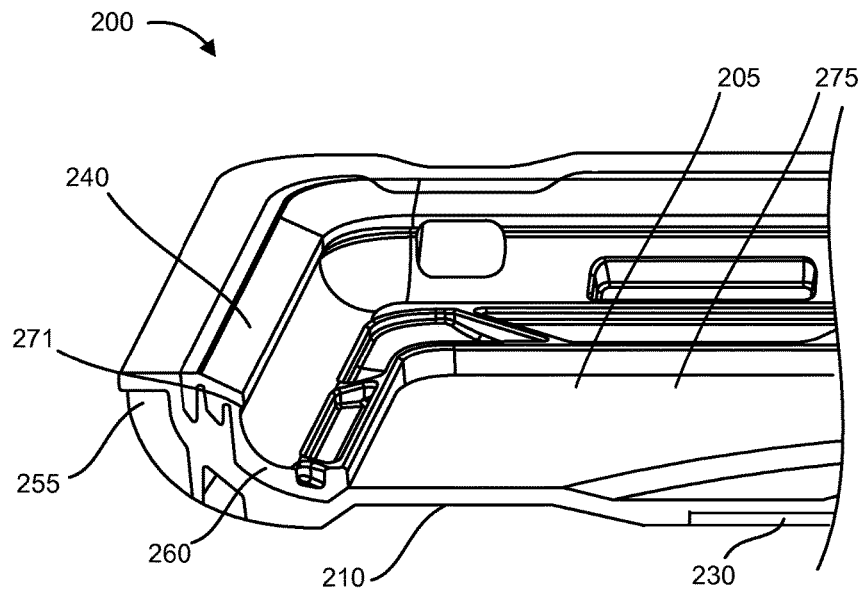
FIG. 3 shows a partial cross-sectional view of the protective case of FIG. 1.

FIG. 3 shows a cross-sectional view of the protective case 200 of FIG. 1. The protective case 200 can have an inner surface 205 and an outer surface 210 opposite the inner surface. The inner surface 205 can define a cavity 270 that is configured to receive and surround at least a portion of the electronic device 100. The inner surface 205 of the protective case 200 can be covered with an interior overmolding 260 that is relatively soft and compressible compared to a base material of the protective case. The interior overmolding 260 can provide a compliant material for the exterior surfaces of the electronic device to seat against when the device is installed in the protective case 200. The interior overmolding 260 can protect the electronic device 100 from being scratched or marred by portions of the protective case that are made of harder materials intended to increase the rigidity and drop test performance of the protective case 100. In some examples, the interior overmolding 260 can be made of a suitable material that can be overmolded, such as silicone rubber, butyl rubber, or thermoplastic elastomer (TPE). The protective case 200 can be made of polycarbonate, NYLON, fiberglass filled NYLON, bamboo, fiberboard, aluminum alloy, or any other suitable material or combination thereof.

The protective case 200 can include an exterior overmolding 255 over the outer surface of the protective case. Due to its compressible nature, the exterior overmolding 255 can absorb shock if the protective case 200 is dropped, thereby reducing shock forces transferred from the protective case to the electronic device 100 when the protective case strikes the ground. The exterior overmolding 255 can also prevent the protective case from sliding off of an inclined surface or a user's lap, since the exterior overmolding has a high coefficient of friction relative to the base material of the protective case.

In one example, the protective case 200 can include a flexible lip 240 that extends around a front perimeter of the protective case 200, as shown in FIG. 3. The flexible lip 240 can flex to permit insertion of the electronic device 100 into the cavity 270 of the protective case 200 and can assist in retaining the electronic device within the protective case after insertion by, for example, snapping over the front perimeter edge of the electronic device and resting against a front surface 105 of the electronic device. In one example, the flexible lip 240 can extend inward toward the cavity 270 and can be defined along an underside of the flexible lip by an undercut 271, which the flexible lip extends beyond. The undercut 271 can be configured to receive an edge of the electronic device, and the flexible lip 240 can be configured to overlap the front surface 105 of the electronic device 100 by a distance d. In some examples, the distance d can be about 0.01-0.5, 0.08-0.25, or 0.1-0.4. The flexible lip 240 can be both durable and resilient to permit numerous insertions and removals of the electronic device 100 into the protective case 200 over the course of the life of the protective case 200 without any appreciable degradation in performance. The flexible lip 240 can be made of any suitable material, including any saturated or unsaturated elastomer. The flexible lip 240 can be made of silicone rubber or a thermoplastic elastomer (TPE). The flexible lip 240 can have any suitable hardness. In some examples, the flexible lip 240 can have a hardness of about 30-70, 30-50, or 40-50 Shore A.

The protective case 200 can have a female mounting portion 220 that permits the protective case to magnetically mount to another component. The female mounting portion 220 can be disposed within the outer surface 210 of the protective case, as shown in FIG. 1. The female mounting portion 220 can include a plurality of recesses 225 arranged in a spaced apart relation around an opening 215 in the protective case 200. The protective case 200 can include a ferrous metal plate 230 located proximate the outer surface of the protective case. In one example, the ferrous metal plate 230 can be adhered to the outer surface 210 of the protective case with a suitable adhesive, such as an epoxy or pressure sensitive adhesive, such as VHB tape sold by 3M Company of Minnesota. In another example, the ferrous metal plate 230 can be dispose within a recess located in the outer surface 215 of the protective case, as shown in FIG. 1, to provide a smooth surface that conforms to the outer surface 210 of the protective case. This configuration, where the ferrous metal plate 230 is substantially flush with the outer surface 215 of the protective case 200, can be more comfortable when the protective case is resting on a user's lap and can provide a protective case with a slimmer profile. Disposing the ferrous metal plate 230 within the outer surface 210 of the protective case 200 can also be desirable to prevent teeter-tottering of the protective case when the protective case is resting on a surface, such as a table or counter and the user is interacting with the touchscreen display (e.g. typing on the touchscreen display) of the electronic device.

Figure 4:
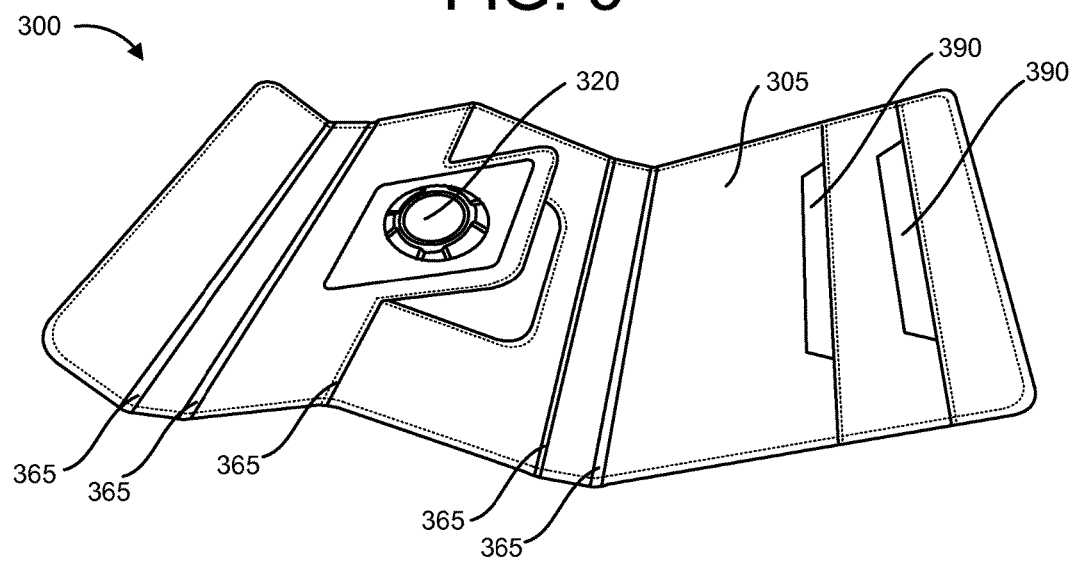
FIG. 4 shows a perspective view of a folding cover that can fold into a variety of configurations and is adapted to receive the protective case of FIG. 1.
Figure 7:
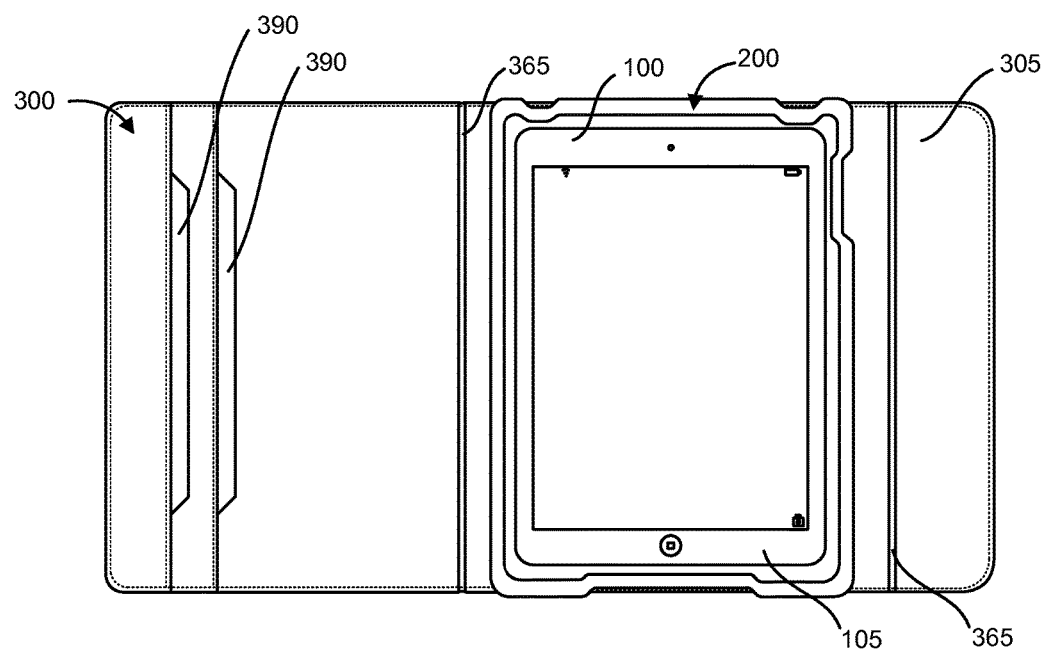
FIG. 7 shows a front view of the folding cover of FIG. 4 in an open configuration and the protective case of FIG. 1 magnetically mounted to the folding cover, where the protective case houses an electronic device.
Figure 8:
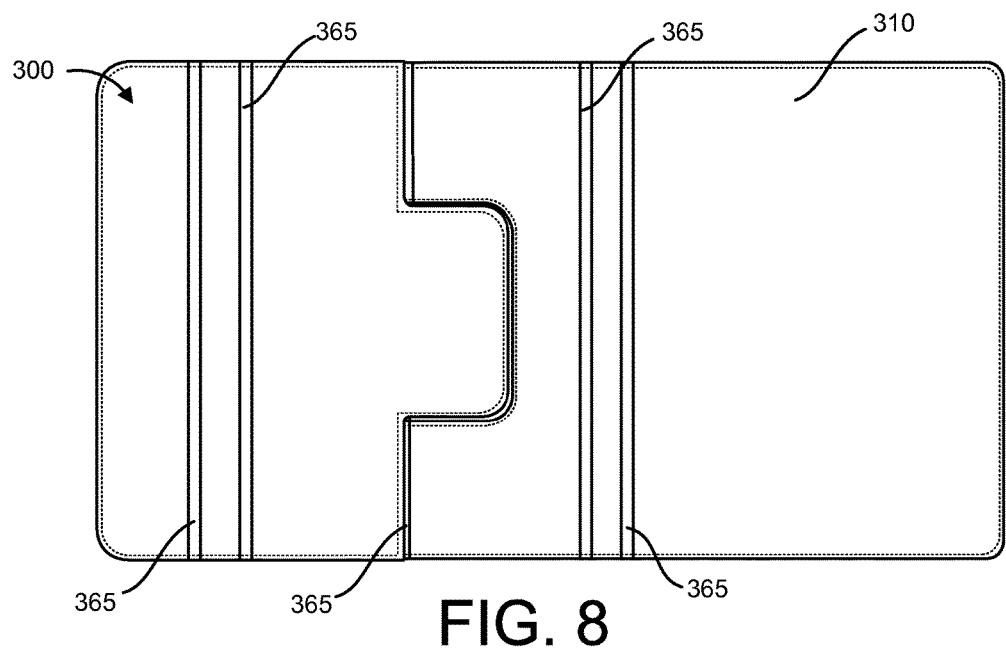
FIG. 8 shows a rear view of the folding cover of FIG. 4 in an open configuration.

The magnetic mounting system can include a folding cover 300, as shown in FIGS. 4-13. FIG. 4 shows the folding cover 300 in an open configuration intended to highlight a plurality of folding joints 365 that traverse the folding cover widthwise and permit the folding cover to be arranged in an assortment of configurations. In some examples folding cover 300 can be arranged in a variety of configurations to support the electronic device 100 in a variety of useful orientations suitable for viewing (e.g. landscape mode or portrait mode), as shown in FIG. 9-13. In another example, the electronic device 100 can lay flat on the folding cover 300, as shown in FIG. 7, and can rotate relative to the folding cover. As shown in FIGS. 4-13, the folding joints 365 of the folding cover 300 can permit the folding cover to be arranged in a variety of useful configurations without damaging the folding cover.

The folding cover 300 can have an inner surface 305 and an outer surface 310 opposite the inner surface. The inner surface 305 of the folding cover 300 can be made of a relatively soft material that does not scratch or damage the touchscreen surface (e.g. glass surface) of the electronic device 100. For instance, the inner surface 305 of the folding cover 300 can be made of suede, microfiber, fabric, leather, polyurethane, polyester, ULTRASUEDE, or other suitable material. In some examples, the inner surface 305 of the folding cover 300 can be adapted to clean the touchscreen surface of the electronic device 100 by, for example, wiping or absorbing oils or other residue left on the touchscreen from a user's fingertips when the folding cover is in a closed position and the inner surface of the folding cover is placed in direct contact with the touchscreen surface of the electronic device.

The folding cover 300 can include a male mounting portion 320 on the inner surface 305 of the folding cover, as shown in FIG. 4. The male mounting portion 320 can include one or more raised engagement portions 325 adapted to engage the one or more recesses 225 in the female mounting portion 220 of the protective case 200. The folding cover 300 can include one or more magnets 350 disposed within the folding cover 300. For example, the one or more magnets 350 can be disposed between the inner surface 305 and outer surface 310 of the folding cover 300.

The one or more magnets 350 disposed in the folding cover 300 can be adapted to exert an attractive force on the ferrous metal plate 230 of the protective case 200. The attractive force can be sufficient to cause the male mounting portion 320 of the folding cover 300 to be drawn against the female mounting portion 220 of the protective case 200 to permit nesting of the male mounting portion within the female mounting portion. As the male mounting portion 320 of the folding cover is drawn toward the female mounting portion 220 of the protective case 200, the raised male mounting portions 325 can orient the protective case in a landscape or portrait mode as the raised male mounting portions 325 of the folding cover 300 are drawn into the respective recesses 225 in the female mounting portion 220 of the protective case.

As shown in FIG. 4, the folding cover 300 can include one or more folding joints 365 that permit the folding cover to be configured into a variety of shapes suitable to support the electronic device 100 at a variety of angles. In some examples, the folding cover 300 can include one or more grooves extending widthwise across the folding cover. The one or more grooves can permit additional adjustability of the angle of display of the electronic device 100. In one example, the folding cover 300 can be arranged in a configuration with the male mounting portion 320 of the folding cover facing outward and oriented at an angle of about 15-30, 30-45, 45-60, or 60-80 degrees with respect to a horizontal plane, where the male mounting portion is ready to receive the female mounting portion 220 of the protective case 200.

In some examples, the plurality of raised engagement portions 325 on the folding cover 300 can include four raised engagement portions positioned radially at 0, 90, 180, and 270 degrees around a midpoint of the male mounting portion 320, as shown in FIG. 4. Each of the plurality of raised engagement portions 325 can include a pair of transition ramps 330 proximate the first and second ends of each raised engagement portion. The pair of transition ramps 330 beside each raised engagement portion 325 can permit the female mounting portion 220 of the protective case 200 to be smoothly rotated relative to the female mounting portion 320 of the folding cover 300 in a clockwise or counterclockwise direction between a landscape mode (see, e.g. FIG. 10) and a portrait mode (see, e.g. FIG. 12).

In some examples, the plurality of recesses can include four recesses 225 positioned radially at 0, 90, 180, and 270 degrees around a midpoint of the female mounting portion 220, as shown in FIG. 1. Each recess 225 can be spaced equidistant from the midpoint of the female mounting portion 220. Each of the plurality of recesses 225 can include a pair of transition ramps 235 proximate the first and second ends of each recess, as show in FIG. 1. The pair of transition ramps 235 on each recess 225 can permit the female mounting portion 220 of the protective case 200 to be smoothly rotated relative to the male mounting portion 320 of the folding cover 300 in a clockwise or counterclockwise direction between a landscape mode (see, e.g. FIG. 10) and a portrait mode (see, e.g. FIG. 12).

As the protective case 200 is smoothly transitioned between a landscape mode and portrait mode or between a portrait mode and landscape mode, a first raised engagement portion 325 that is engaged with a first recess 225 may disengage from the first recess and may subsequently engage with a second recess 225 located a distance from the first recess. When the first raised engagement portion 325 is transitioning between the first and second recesses 225 (i.e. not engaged with either recess), the ferrous steel plate 230 may be at a distance from the plurality of magnets 350 where the magnets still exert a significant attractive force on the ferrous steel plate 230 to hold the protective case 200 in place, but the attractive force will be lessened, thereby permitting a user to decouple the protective case from the folding cover 300 if they desire to do so more easily than if the raised engagement portions 325 were seated in the recesses 225 and the ferrous metal plate 230 was in closer proximity to the plurality of magnets. In some examples, a suitable method for decoupling the protective case 200 from the folding cover 300 may include rotating the protective case 200 about 45 degrees and then prying the protective case from the folding cover 300 by grasping an edge of the protective case 200 and using the length or width of the protective case for leverage to assist in separating the ferrous metal plate 230 from the attractive force exerted by the plurality of magnets 350.

Figure 45:
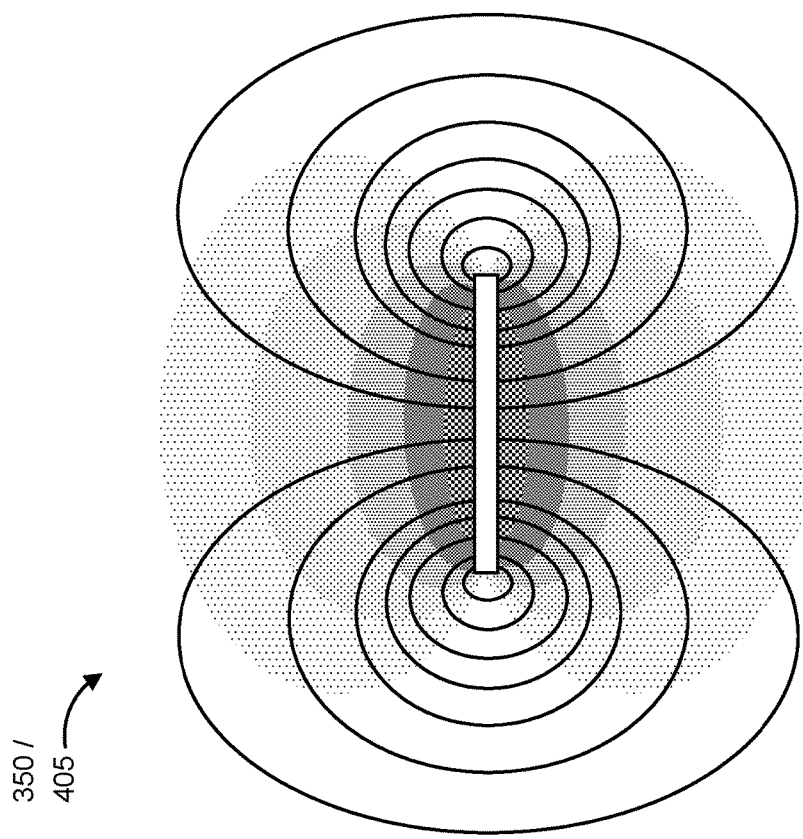
FIG. 45 shows a symmetrical magnetic field generated by a disk-shaped magnet.

The plurality of magnets of the folding cover 300 can include four magnets 350 spaced equally around an opening 355 in the male mounting portion 320. FIG. 43 shows the plurality of magnets 350 arranged in a configuration suitable for inclusion in the folding cover. In the example shown in FIG. 44, the magnets can be positioned on a metal member 380. The metal member 380 can alter the magnetic field produced by the magnets, resulting in a stronger attractive force being created in a location with the ferrous metal plate of the protective cover is intended to reside upon magnetically mounting the protective cover to the folding cover. FIG. 45 shows a visual representation of the flux lines of a magnetic field produced by a disk-shaped magnet 350. In contrast, FIG. 44 shows a visual representation of the flux lines of magnetic fields produced by disk-shaped magnets 350 positioned on a ferrous metal member 380. The ferrous metal member 380 causes the strength of the magnetic field to be increased proximate a top side surface of the metal member 380 and decreased proximate a bottom side of the metal member. In some examples, the ferrous metal member 380 in the folding cover 300 can be a steel plate having a thickness of about 0.01-0.03, 0.03-0.125, 0.125-0.375, or 0.03-0.25 in.

In some examples, the magnets 350 can be concealed within the folding cover 300 between the inner surface and the outer surface. In other examples, the magnets 350 can be visible on the inner surface of the folding cover proximate the male mounting portion 320. The magnets 350 can be magnetically attracted to the ferrous metal plate 230 associated with the back surface 210 of the protective case 200. The ferrous metal plate 230 can be a steel plate having a thickness of about 0.03-0.25 in or any other suitable thickness. The ferrous metal plate can have dimensions that allow it to be in close proximity to at least two of the plurality of magnets 350 when the protective case 200 is magnetically mounted to the male mounting portion of the folding cover 300, surface mount 400, or dock 500.

The surface mount 400 shown in FIGS. 35-41 can be removably attachable to a surface associated with a, for example, wall, mirror (see, e.g., FIG. 42), stand, articulating stand, wall mount, articulating wall mount, automobile dash, automobile seat back, or airplane seat back, and can thereby allow the protective case 200 containing the electronic device to be magnetically mounted to a wide variety of surfaces. The surface mount 400 can include a male mounting portion 410, as show in FIGS. 35 and 36. The male mounting portion 410 can include a plurality (e.g. two or more) raised engagement portions 415 adapted to each engage one of the plurality of recesses 225 in the female mounting portion 220 of the protective case 200 (similar to how the raised engagement portions 325 of the male mounting portion 320 on the folding cover 300 are adapted to engage the plurality of recesses 225 in the female mounting portion 220 of the protective case 200). A plurality of magnets 405 can be located on or disposed within the surface mount 400. The plurality of magnets 405 can be positioned radially at 0, 90, 180, and 270 degrees around a midpoint of the male mounting portion 410 of the surface mount 400. In another example, the plurality of magnets 405 can be positioned radially at 45, 135, 225, and 315 degrees around a midpoint of the male mounting portion 410 of the surface mount 400.

Figure 35:
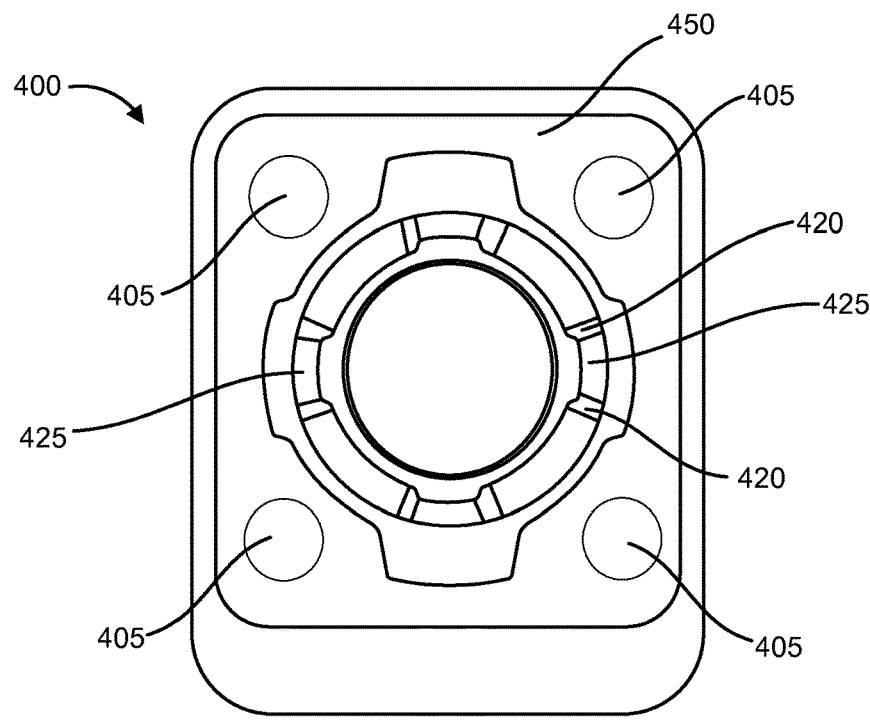
FIG. 35 shows a front view of a surface mount that is adapted to receive the protective case of FIG. 1, where a plurality of magnets are visible on a front side surface of the surface mount.

The plurality of magnets 405 of the surface mount 400 can be visible or concealed within the surface mount. FIG. 35 shows an example of the surface mount 400 where the plurality of magnets 350 are visible, and FIG. 36 shows an example of the surface mount 400 where the plurality of magnets 350 are concealed within the surface mount.

Figure 36:
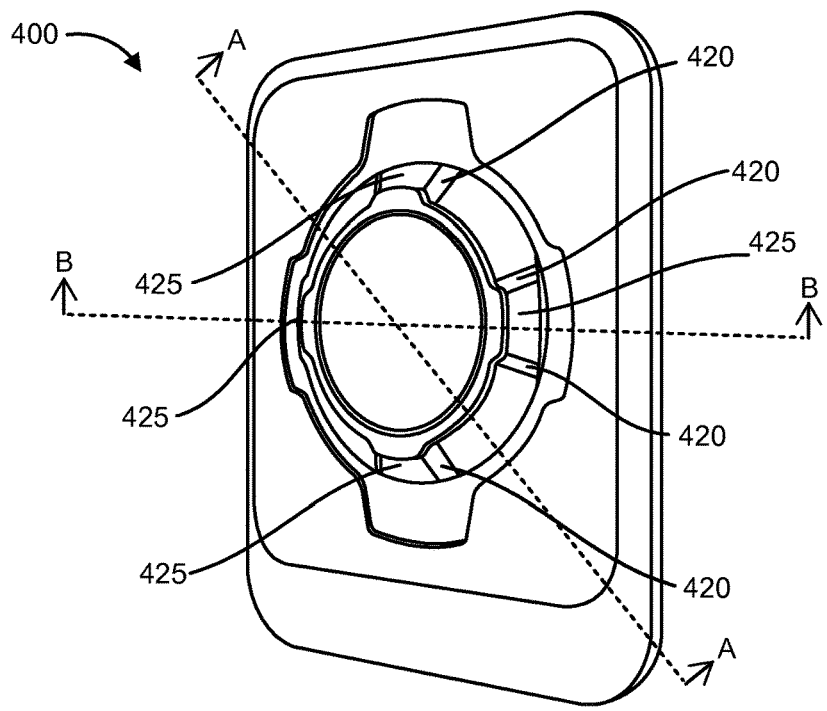
FIG. 36 shows a right side perspective view of a surface mount that is adapted to receive the protective case of FIG. 1, where a plurality of magnets are concealed within the surface mount.
Figure 37:
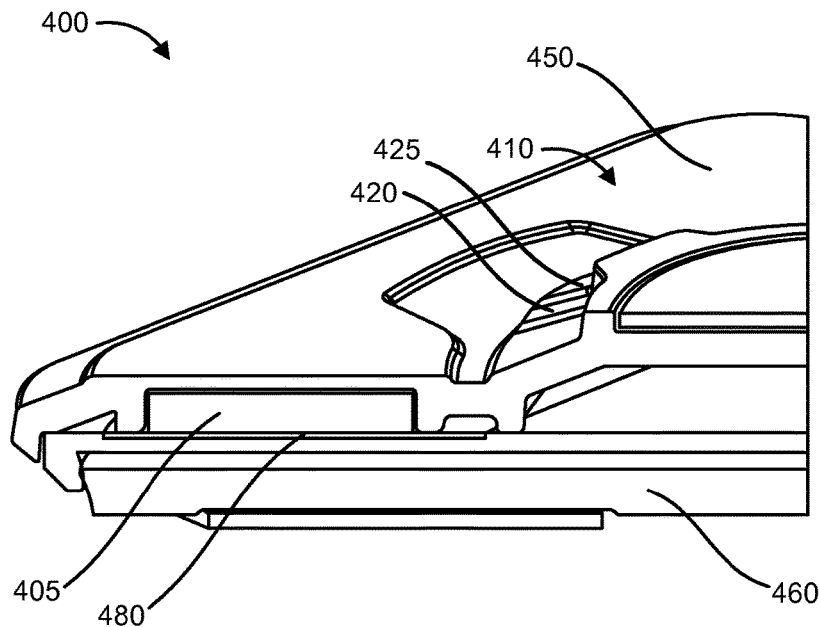
FIG. 37 shows a cross-sectional view of the surface mount of FIG. 36 taken along section A-A.
Figure 38:
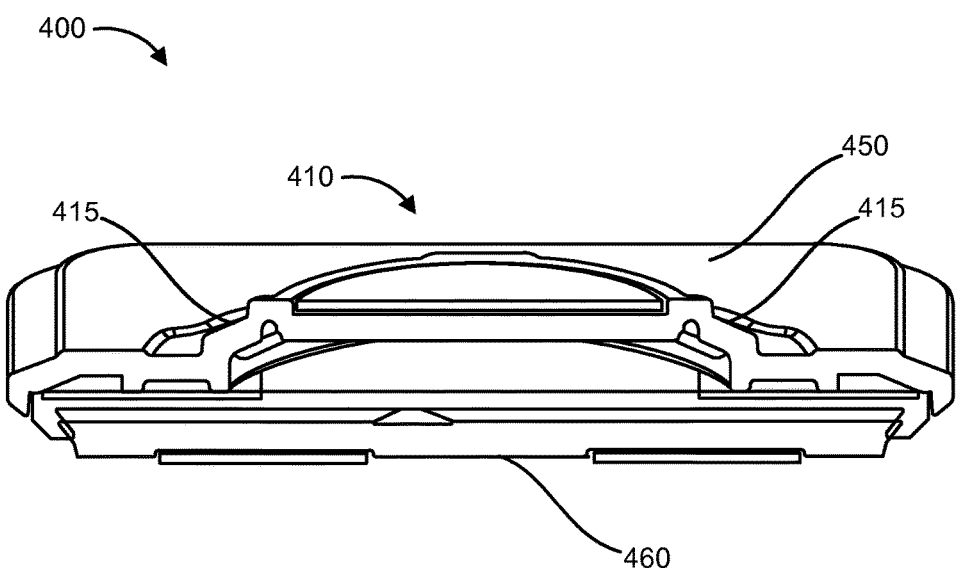
FIG. 38 shows a partial cross-sectional view of the surface mount of FIG. 36 taken along section B-B.

FIG. 37 shows a cross-sectional view of the surface mount 400 of FIG. 36 taken along section A-A. A magnet 405 and a ferrous metal member 480 are visible within the surface mount 400. The magnet 405 is positioned on top of the ferrous metal member 480 to produce a magnetic field similar to the magnetic field shown in FIG. 44. FIG. 38 shows a partial cross-sectional view of the surface mount of FIG. 36 taken along section B-B. Section B-B passes through two opposing raised engagement portions 415.

Figure 39:
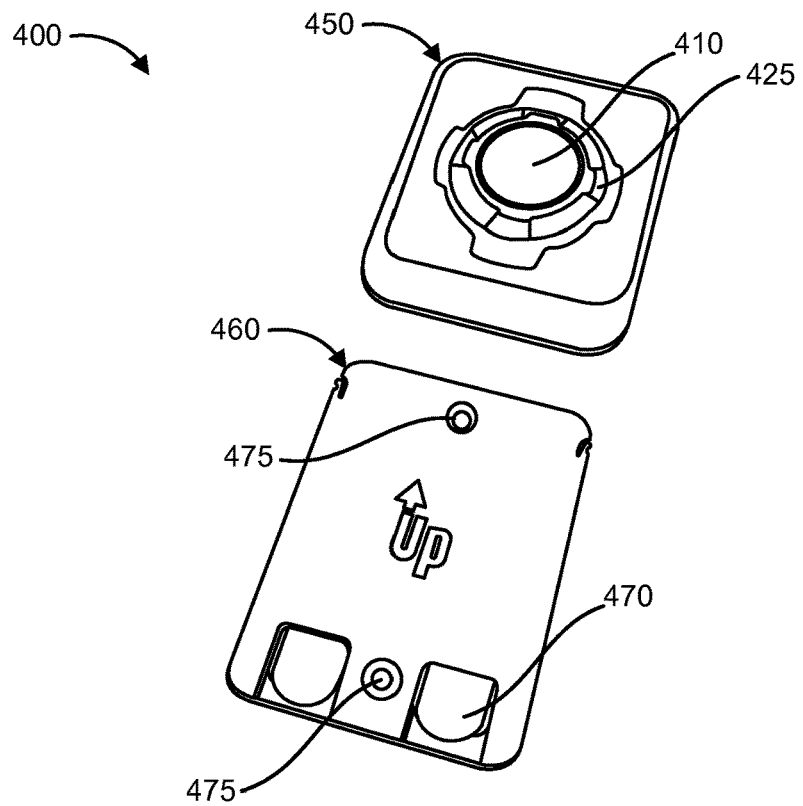
FIG. 39 shows a bottom perspective view of the surface mount of FIG. 36 showing installation of a front member onto a back member.
Figure 40:
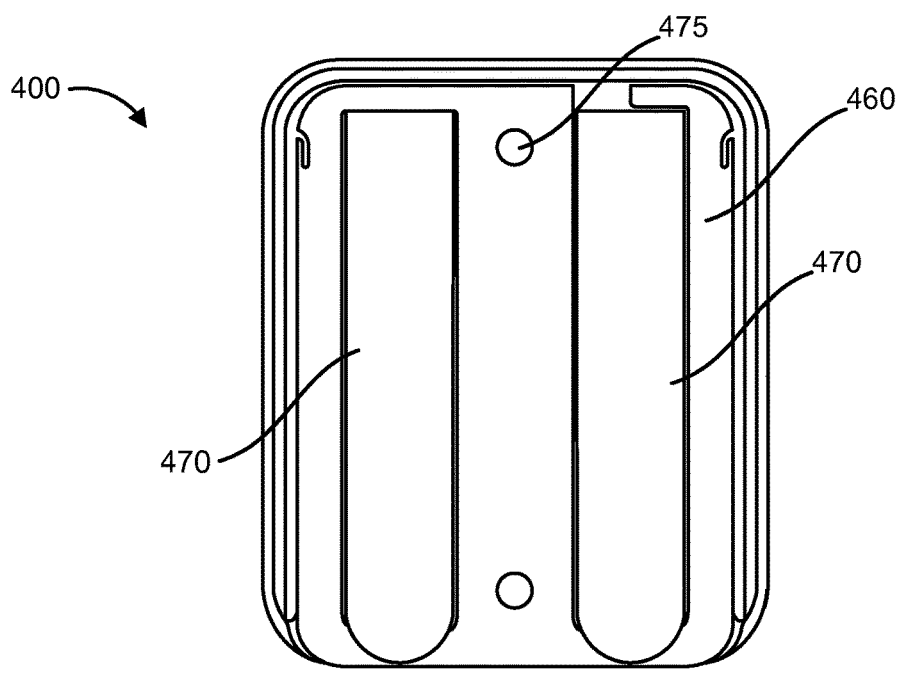
FIG. 40 shows a rear view of the surface mount of FIG. 36.
Figure 41:
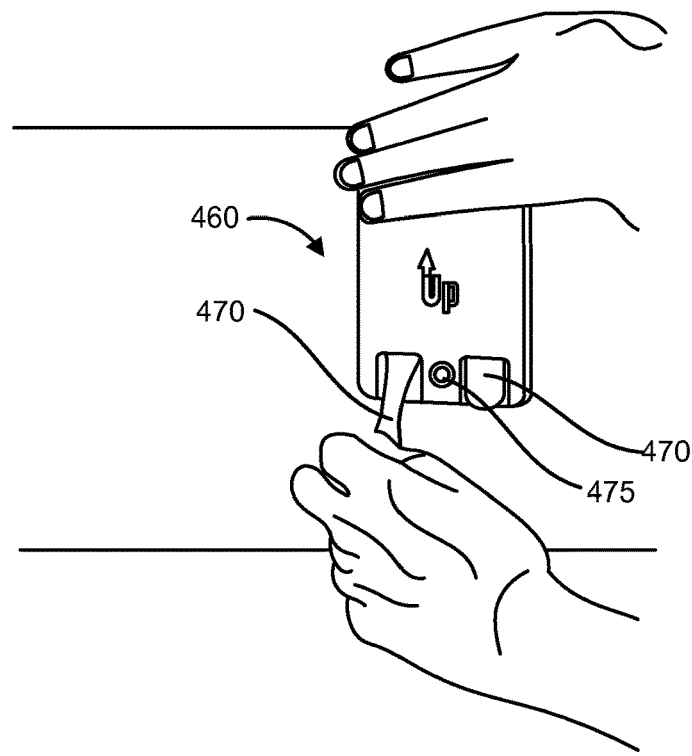
FIG. 41 shows a perspective view of an uninstallation process where the back member of FIG. 39 is being removed from a wall by a user.
Figure 42:
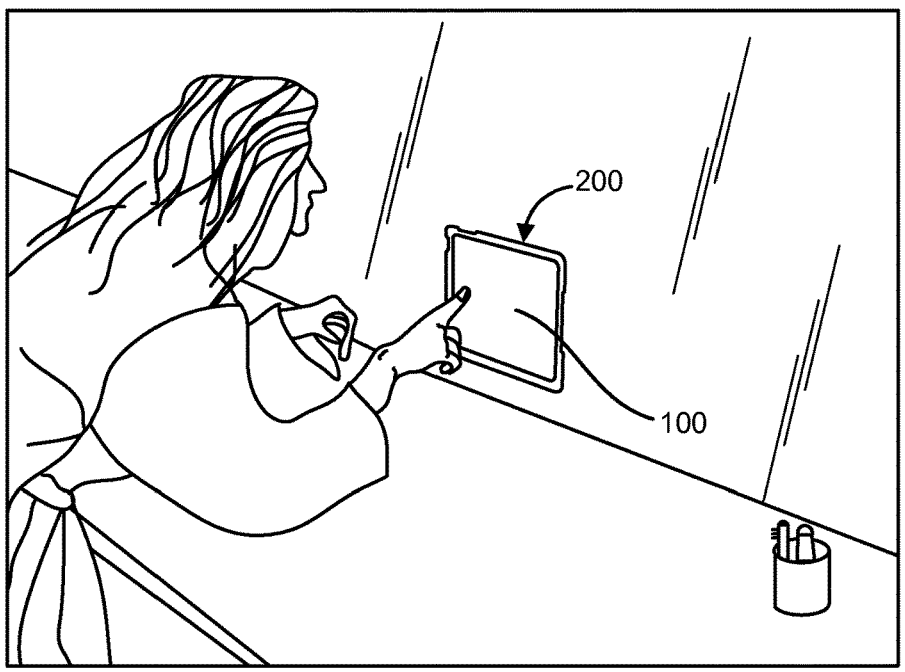
FIG. 42 shows a perspective view of a user interacting with an electronic device that is housed in the protective case of FIG. 1 and mounted to a wall using the surface mount of FIG. 35.

FIG. 39 shows a perspective view of the surface mount of FIG. 36 demonstrating installation of a front member 450 onto a back member 460 to form the surface mount 400. The back member 460 can be configured to be mounted directly to a surface using an adhesive strip 470 positioned on a back surface of the back member, as shown in FIG. 40. When a user wants to remove the back member 460 from the surface, the user can simply pull downward on the adhesive strips, as shown in FIG. 41, to disengage the adhesive strips from the surface. In other examples, fasteners can be used instead of adhesive strips. The fasteners can be installed in thru holes 475 located in the back member 460 and fastened to the surface where the back member is to be mounted. In other examples, such as where the surface mount 400 will need to support a large, heavy tablet computer, monitor, or television, both adhesive strips and fasteners may be used to increase the load capacity of the surface mount.

The plurality of magnets 405 can be adapted to exert an attractive force on the ferrous metal plate 230 of the protective case 200. The attractive force can cause the male mounting portion 410 of the surface mount 400 to remain engaged with the female mounting portion 220 of the protective case 200. In another example, the plurality of magnets 405 can be replaced with one annular-shaped magnet circumscribing the male mounting portion 410. In yet another example, the plurality of magnets can include two, three, four, or more magnets positioned at any suitable locations within the surface mount 400 to effectively exert an attractive force that causes the male mounting portion 410 of the surface mount 400 to remain engaged with the female mounting portion 220 of the protective case 200.

The plurality of raised engagement portions 415 of the surface mount 400 can include two or more raised engagement portions 415. In some examples, the plurality of raised engagement portions 415 can include four raised engagement portions positioned radially at 0, 90, 180, and 270 degrees along a circle having a center point that is also the midpoint of the male mounting portion 410 of the surface mount 400, as show in FIG. 12. In another example, the raised engagement portions 415 can be positioned radially at 45, 135, 225, and 315 degrees (or any other suitable angular locations) on a circle having a center point that is also the midpoint of the male mounting portion 410 of the surface mount 400. In yet another example, the plurality of raised engagement portions 415 can include two raised engagement portions positioned radially at 0 and 180 or 90 and 270 degrees along a circle having a center point that is also the midpoint of the male mounting portion 410 of the surface mount 400.

Each of the plurality of raised engagement portions 415 can include a pair of transition ramps 420 proximate a first and second end of each raised engagement portion. The pair of transition ramps 420 on each raised engagement portion 415 can permit the female mounting portion 220 of the protective case 200 to be smoothly rotated relative to the male mounting portion 410 of the surface mount 400 in a clockwise or counterclockwise direction between a landscape mode (see, e.g. FIG. 42) and a portrait mode.

In some examples, the plurality of recesses 225 can include four recesses positioned radially at 0, 90, 180, and 270 degrees along a circle having a center point that is also the midpoint of the female mounting portion 220. In another example, the plurality of recesses can include four recesses 225 positioned radially at 45, 135, 225, and 315 degrees (or any other suitable angular locations) along a circle having a center point that is also the midpoint of the female mounting portion 220. In yet another example, the plurality of recesses 225 can include two recesses positioned radially at 0 and 180 or 90 and 270 degrees along a circle having a center point that is also the midpoint of the female mounting portion 220 of the protective cover.

Each of the plurality of recesses 225 in the protective cover 200 can include a pair of transition ramps 235. The pair of transition ramps 235 on each recess 225 can permit the female mounting portion 220 of the protective case 200 to be smoothly rotated relative to the male mounting portion 410 of the surface mount 400 in a clockwise or counterclockwise direction between a landscape mode (see, e.g. FIG. 11) and a portrait mode (see, e.g. FIG. 10).

The plurality of magnets 405 in the surface mount 400 can include four magnets 405 equally spaced around the male mounting portion 410. In the example, as shown in FIG. 35, the four magnets 405 can be positioned radially at 45, 135, 225, and 315 degrees, respectively, on a circle having a center point that is aligned with a midpoint of the male mounting portion 410 of the surface mount 400. The magnets 405 can be magnetically attracted to the ferrous metal plate 230 disposed in the back surface 210 of the protective case 200. In some examples, the ferrous metal plate 230 in the protective case 200 can be a steel plate having a thickness of about 0.01-0.03, 0.03-0.125, 0.125-0.375, or 0.03-0.25 in. The ferrous metal plate 230 can be a single plate as shown in FIG. 2. Alternately, the ferrous metal plate 230 can be two or more metal plates positioned to correspond to the location of one or more magnets 405 located in the surface mount 400.

Figure 5:
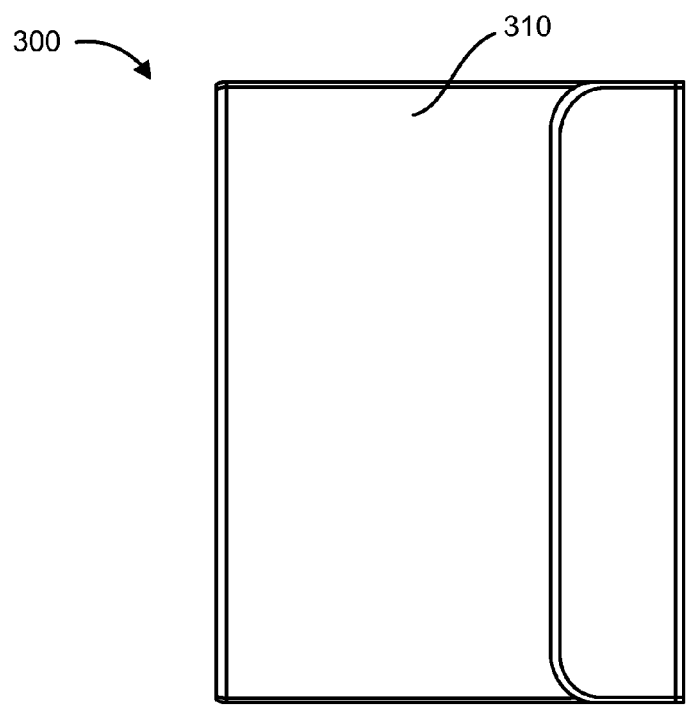
FIG. 5 shows a front view of the folding cover of FIG. 4, the folding cover being in a closed configuration.
Figure 6:
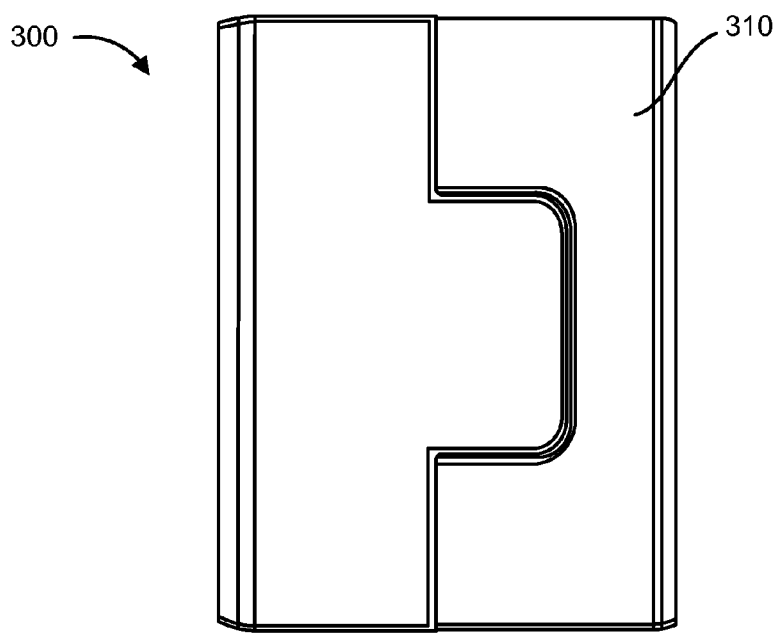
FIG. 6 shows a rear view of the folding cover of FIG. 5, the folding cover being in a closed configuration.

In some examples, an apparatus for magnetically mounting an electronic device can include a protective case 200 adapted to receive an electronic device 100 and a folding cover 300 adapted to receive the protective case 200 via a magnetic connection. As shown in FIG. 5, the folding cover 300 can be oriented in a closed position suitable for covering a display screen of the electronic device 100 when the electronic device is not being used. As shown in FIG. 7, the folding cover 300 can be oriented in an open position suitable for viewing the display screen of the electronic device 100. In one example, the inner surface 305 of the folding cover can include an integrated or adhered keyboard to permit a user to interact with the electronic device 100 without touching the touchscreen. This feature can be desirable if the user prefers a real keyboard instead of a touchscreen keyboard or if the user does not want to leave fingerprints on the touchscreen surface, which can impair viewing by imparting smudges on the touchscreen, which may require cleaning.

In some examples, the keyboard can communicate wirelessly with the electronic device using, for example, a Bluetooth wireless technology standard. In one instance, the keyboard can be detachable from the inner surface 305 of the folding cover 300 (e.g. using a hook and loop fastener or other mechanical attachment feature) to permit the user to operate the keyboard from any suitable distance away from the electronic device. In one example, the user can be sitting on a couch and can use the detachable keyboard to transmit data to an electronic device 100 that is magnetically mounted to a surface mount 400 adhered to an opposing wall where the display screen of the electronic device is visible to the user.

The folding cover 300 can include a magnet that is adapted to actuate a switch within the electronic device. In one example, the magnet can be disposed within the folding cover 300 and can be located proximate an inner surface 305 of the folding cover. When the folding cover 300 is in a closed position with the inner surface 305 resting against the front surface of the electronic device 100, as shown in FIG. 5, the magnet may cause the electronic device to enter a sleep or standby mode. When the folding cover transitions from a closed position to an open position, as shown in FIG. 7, movement of the magnet away from the electronic device 100 may actuate the switch within the electronic device and cause the electronic device to wake from the sleep or standby mode and cause the touchscreen to illuminate and become active.

Figure 9:
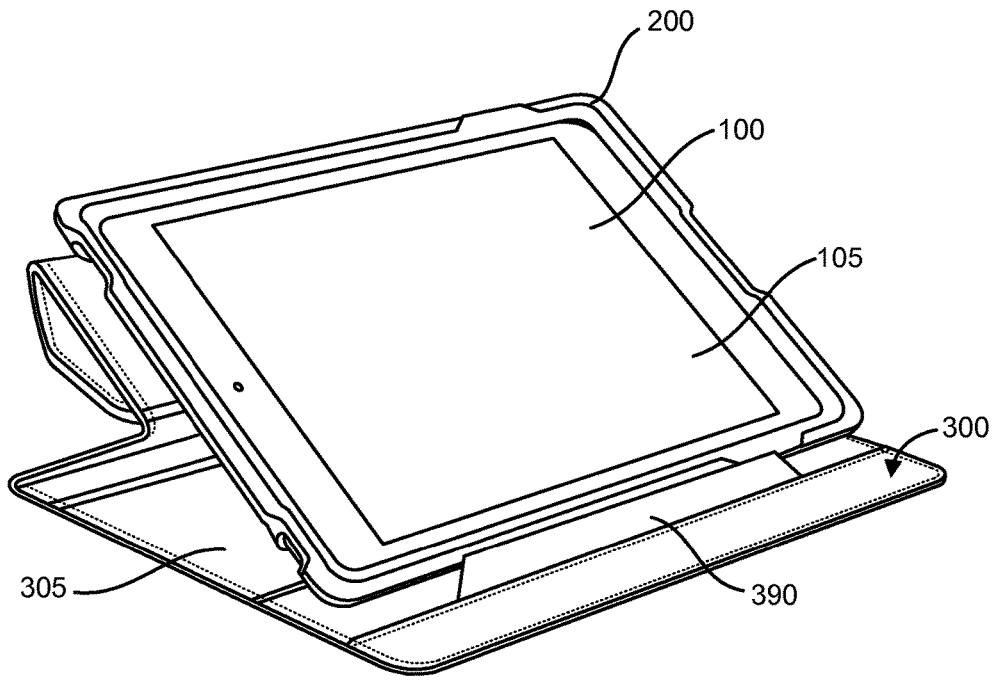
FIG. 9 shows a front perspective view of the folding cover of FIG. 4 in a folded configuration and the protective case of FIG. 1 magnetically mounted to the folding cover, where the protective case houses an electronic device in a landscape orientation.
Figure 10:
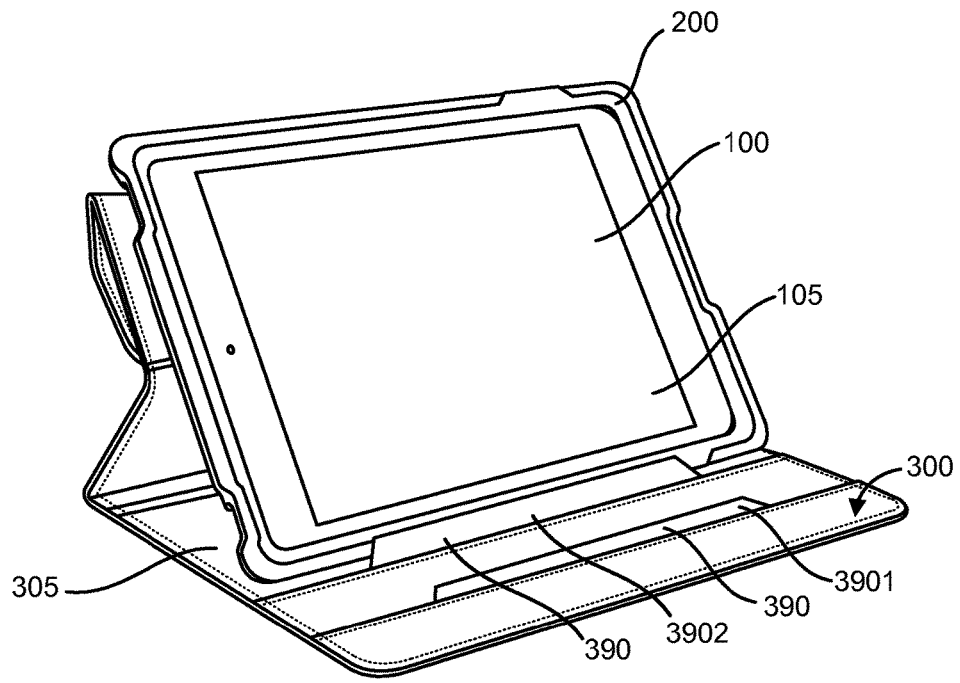
FIG. 10 shows a front perspective view of the folding cover of FIG. 4 in a folded configuration and the protective case of FIG. 1 magnetically mounted to the folding cover, where the protective case houses an electronic device in a landscape orientation.
Figure 11:
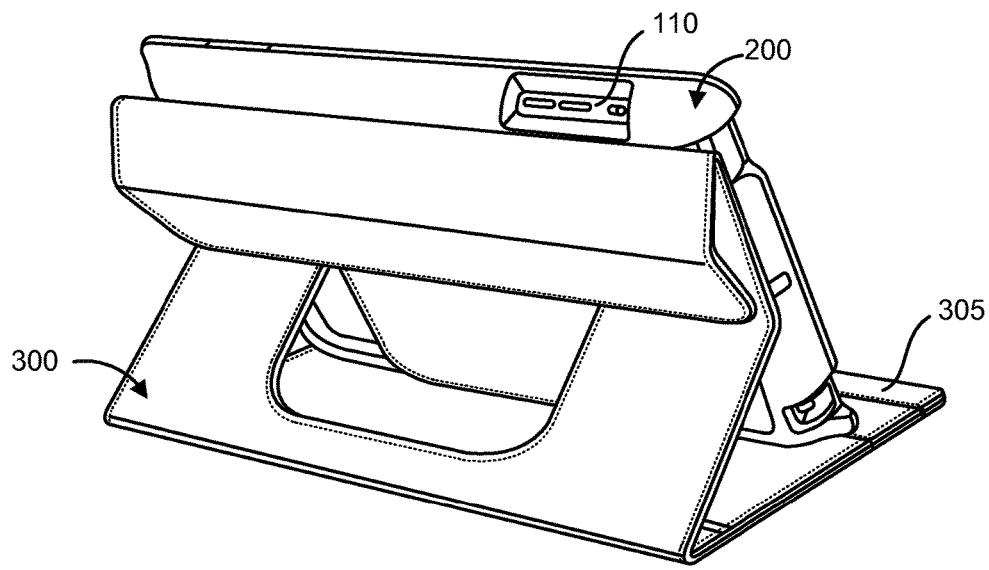
FIG. 11 shows a rear perspective view of the folding cover of FIG. 4 in a folded configuration and the protective case of FIG. 1 magnetically mounted to the folding cover, where the protective case houses an electronic device in a landscape orientation.
Figure 12:
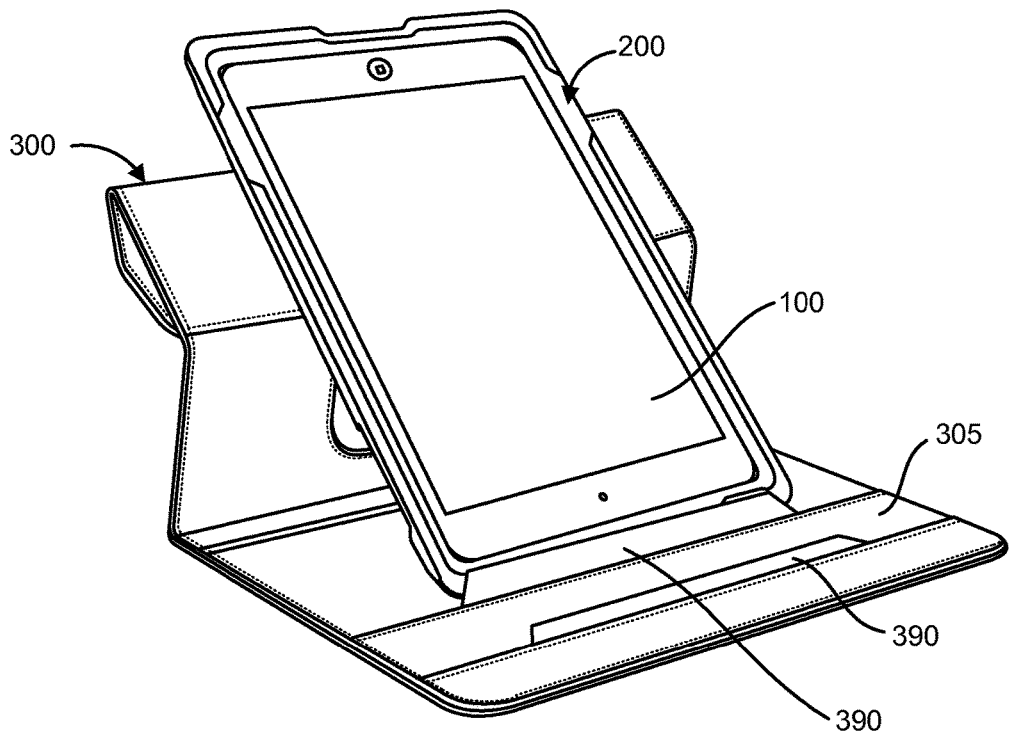
FIG. 12 shows a front perspective view of the folding cover of FIG. 4 in a folded configuration and the protective case of FIG. 1 magnetically mounted to the folding cover, where the protective case houses an electronic device in a portrait orientation.
Figure 13:
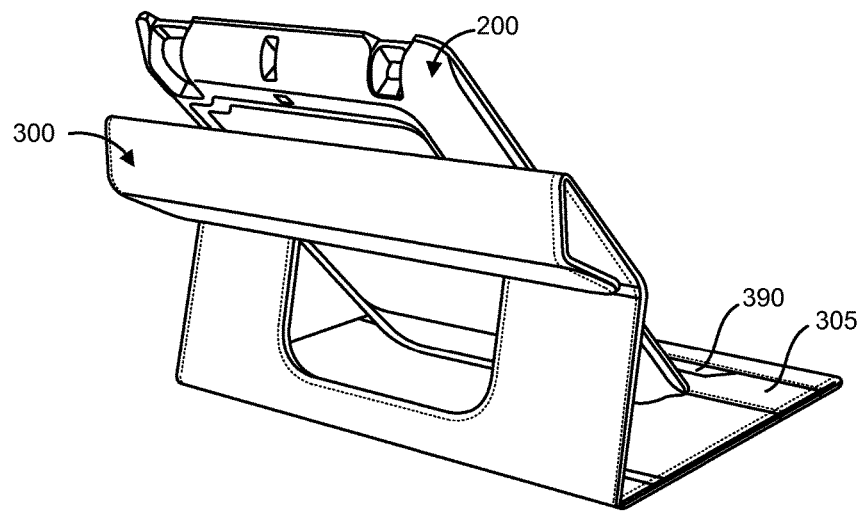
FIG. 13 shows a rear perspective view of the folding cover of FIG. 4 in a folded configuration and the protective case of FIG. 1 magnetically mounted to the folding cover, where the protective case houses an electronic device in a portrait orientation.

FIGS. 9-13 show the folding cover 300 in a variety of configurations with the protective case 200 magnetically mounted to the folding cover. FIG. 9 shows the protective case 200 housing the electronic device 100 and oriented in a landscape mode while being supported by the folding cover 300 at an angle of about 30 degrees. Similarly, FIG. 10 shows the protective case 200 housing the electronic device 100 and oriented in a landscape mode while being supported by the folding cover 300 at an angle of about 60 degrees. FIG. 11 shows a rear perspective view of the magnetic mounting apparatus shown in FIG. 10. FIG. 12 shows the protective case 200 housing the electronic device 100 and oriented in a portrait mode while being supported by the folding cover 300 at an angle of about 60 degrees. FIG. 13 shows a rear perspective view of the magnetic mounting apparatus shown in FIG. 12.

As shown in FIGS. 9-13, the folding cover 300 can include one or more folding retention members 390. The folding retention members 390 can stabilize the protective case 200 against the folding cover 300 and can prevent the folding cover from collapsing when the protective case and electronic device are arranged at a certain viewing angle where gravity might otherwise encourage the protective case to slip while resting on the inner surface of the folding cover. In some examples, the folding retention members 390 can be ferrous metal strips encases in a soft, compliant material that will not harm the display screen of the electronic device, despite frequent, direct contact. The ferrous metal strips can be encased in, for example, suede, microfiber, fabric, leather, polyurethane, polyester, ULTRASUEDE, or other suitable material. The soft material that encases each ferrous metal strip can be captured by a row of stitching existing along an inner surface of the folding cover. Since the folding retention member 390 is captured along only one edge, the folding retention member can transition between a flat position (see, e.g. a first folding retention member 3901 in FIG. 10) and a standing position (see, e.g. a second folding retention member 3902 in FIG. 10). A magnet can be disposed within the folding cover 300 anywhere along or near the length of the folding retention member 390. The attractive force exerted by the magnet on the folding retention member 390 can be sufficient to maintain the folding retention member in a flat position when not being used to support an edge of the protective case 200.

Manufacturers of electronic devices often make competing products that have similar screen sizes but different external dimensions. For instance, Google, Inc., headquartered in California, sells a tablet computer under the trademark NEXUS 7, which has a 7-inch touchscreen display and external dimensions of 198.5 mm by 120 mm by 10.45 mm thick. Samsung Electronics, located in South Korea, sells a tablet computer under the trademark GALAXY TAB 3, which has a 7-inch touchscreen display and external dimensions of 188 mm by 111.1 mm by 9.9 mm. Many other manufacturers make tablet computers that have similar screen sizes but slight different external dimensions. It is desirable to provide a protective mounting solution for as many of these tablet computers as possible. However, it is not desirable to make entirely unique variations of protective mounting solution to accommodate small variations in external dimensions of competing electronic devices, since this would require significant expenditures on tooling for manufacturing. Rather, it is desirable to manufacture the mounting components described herein to accommodate variations in external dimensions of competing electronic devices. For instance, it can be desirable to use a universal folding cover 300 and a universal surface mount 400 to accommodate all, or nearly all, tablet computers with a touchscreen display of about 7 inches. In some examples, the protective case 200 may be the only component that needs to be modified to accommodate unique external dimensions of a specific tablet model (i.e. the protective case needs to be device-specific). To ensure proper fit within the universal folding cover 300, the external dimensions of the protective case 200 for each specific tablet model can remain constant. In particular, despite having different cavity 270 dimensions, an external length $L_2$ and external width $W_2$ of the protective case 200 can remain constant, for example, for the NEXUS 7 and GALAXY TAB 3 devices ($L_{2\_NEXUS7}=L_{2\_GALAXYTAB3}$; $W_{2\_NEXUS7}=W_{2\_GALAXYTAB3}$). Conversely, the internal length $L_1$ and internal width $W_1$, which define the cavity 270 of the protective case 200, can vary for two different models of tablet computers having similar or identical screen sizes (i.e. the protective case can be device-specific). For example, the internal length and internal width for the NEXUS 7 may be larger than the internal length and internal width for the GALAXY TAB 3 ($L_{1\_NEXUS7}>L_{1\_GALAXYTAB3}$; $W_{1\_NEXUS7}>W_{1\_GALAXYTAB3}$). A similar approach can be used for other models of tablet computers or smartphones having touchscreens with similar sizes (e.g. 4-inch, 5-inch, 8-inch, 10-inch, or larger). A system for mounting an electronic device to a surface can include a universal folding cover 300 or a universal surface mount 400 configured to magnetically mount to a device-specific protective case 200 that is adapted to receive and house the electronic device.

Figure 14:
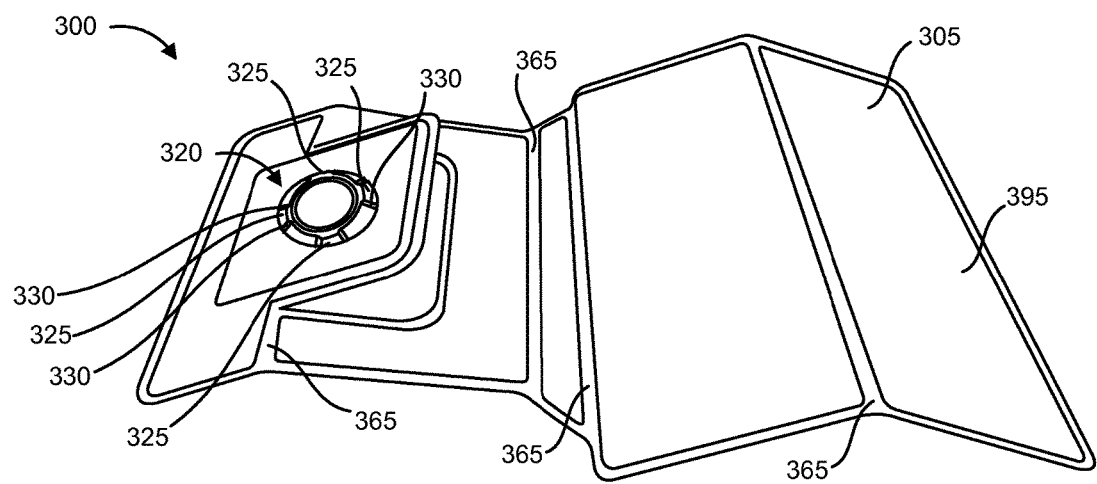
FIG. 14 shows a perspective view of a folding cover that can fold into a variety of configurations and is adapted to receive the protective case of FIG. 1.
Figure 15:
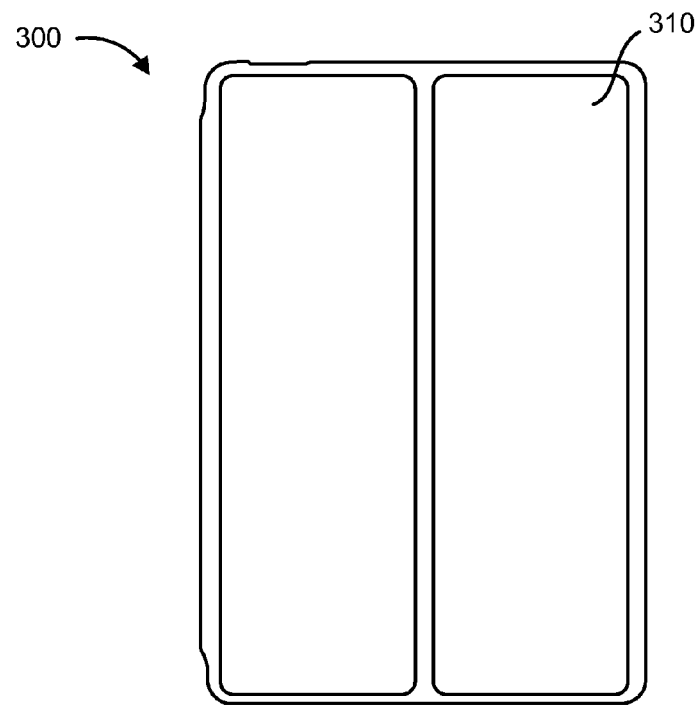
FIG. 15 shows a front view of the folding cover of FIG. 14.
Figure 16:
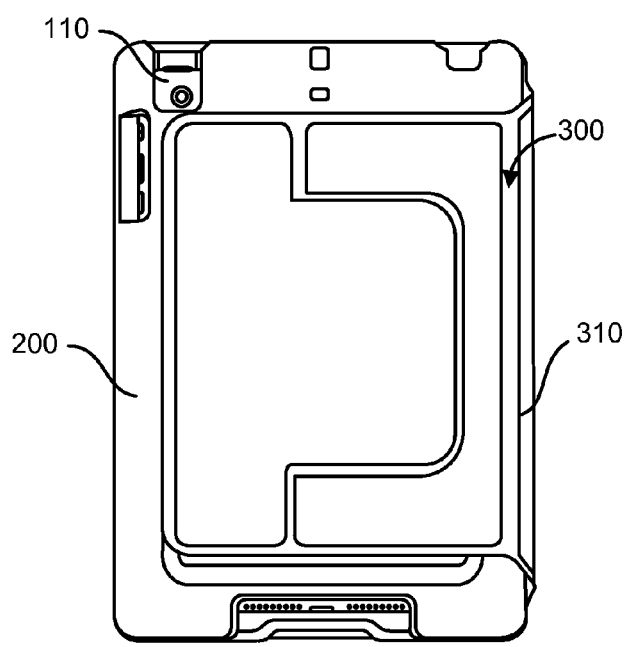
FIG. 16 shows a rear view of the folding cover of FIG. 14 in a closed configuration around the protective case of FIG. 1, where the protective case houses an electronic device.
Figure 17:
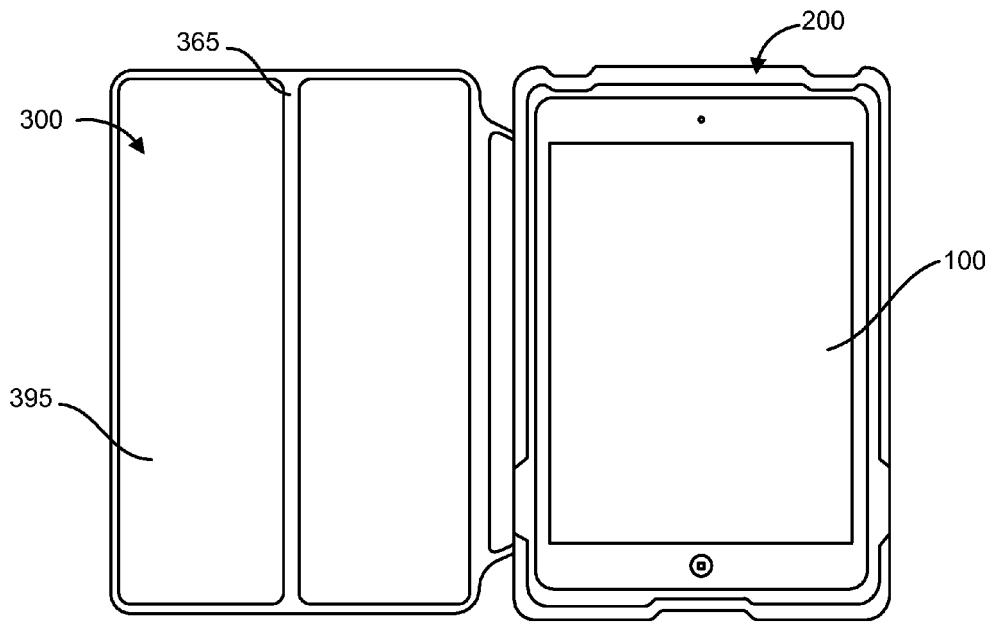
FIG. 17 shows a front view of the folding cover of FIG. 14 in an open configuration with the protective case of FIG. 1 magnetically mounted to the folding cover, where the protective case houses an electronic device.
Figure 18:
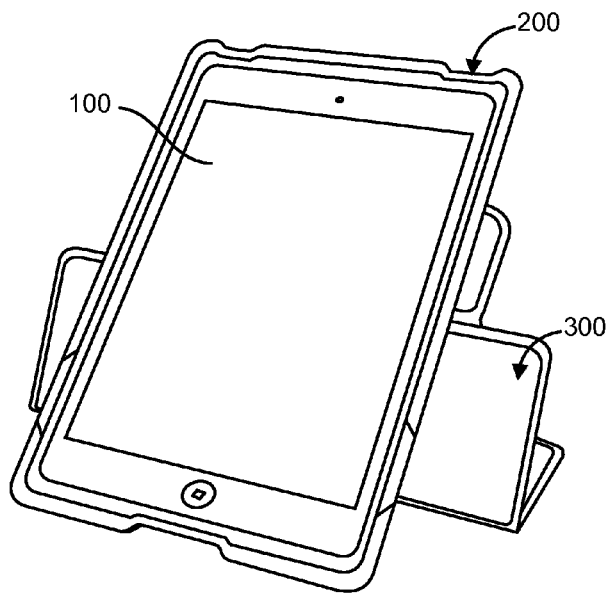
FIG. 18 shows a front perspective view of the folding cover of FIG. 14 in a folded configuration with the protective case of FIG. 1 magnetically mounted to the folding cover, where the protective case houses an electronic device in a portrait orientation.
Figure 19:
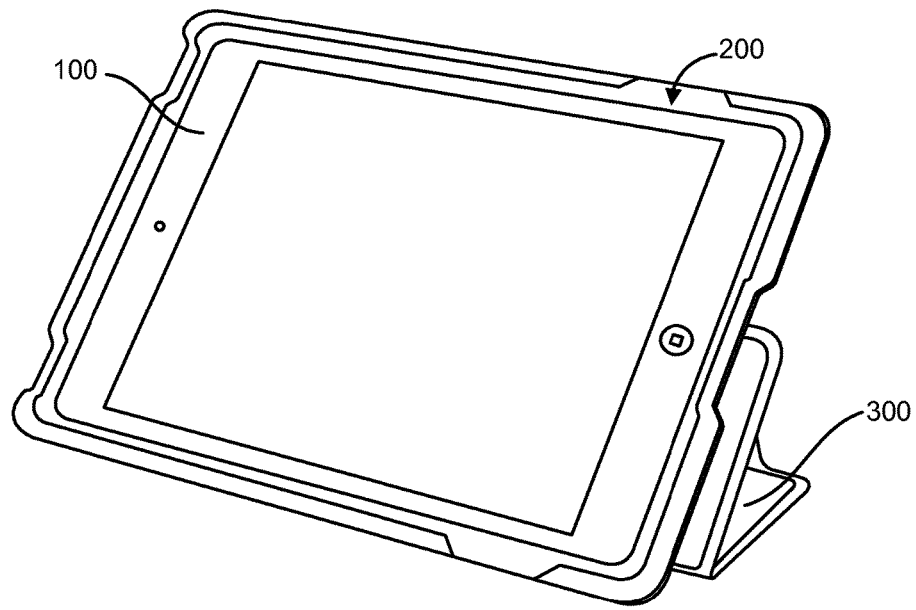
FIG. 19 shows a front perspective view of the folding cover of FIG. 14 in a folded configuration with the protective case of FIG. 1 magnetically mounted to the folding cover, where the protective case houses an electronic device in a landscape orientation.
Figure 20:
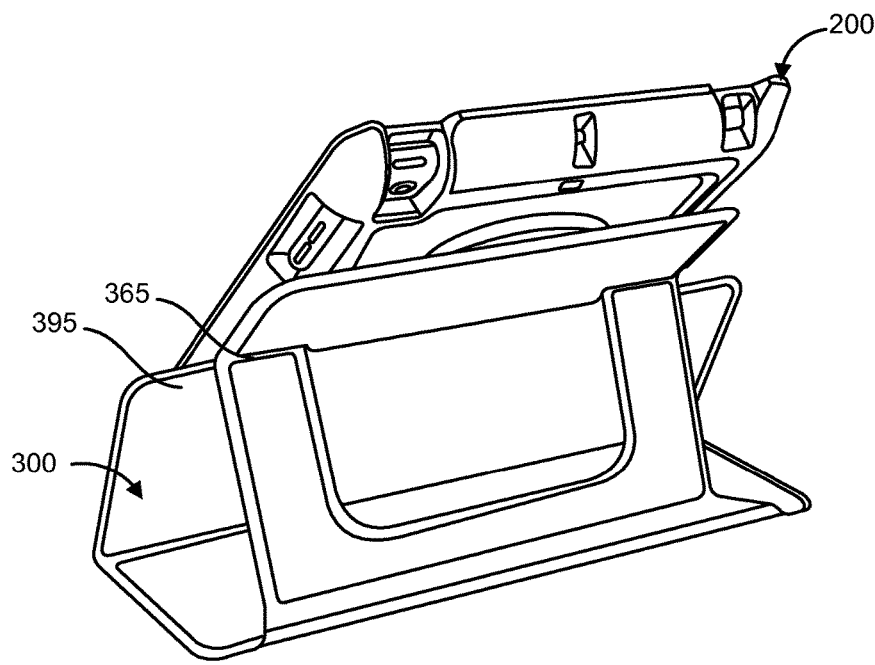
FIG. 20 shows a rear perspective view of the folding cover of FIG. 14 in a folded configuration with the protective case of FIG. 1 magnetically mounted to the folding cover, where the protective case houses an electronic device in a portrait orientation.
Figure 21:
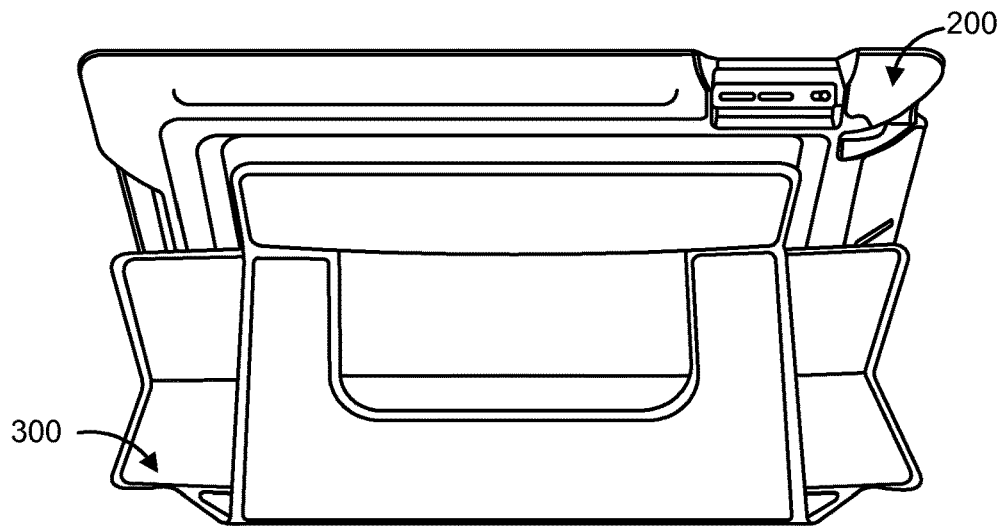
FIG. 21 shows a rear view of the folding cover of FIG. 14 in a folded configuration with the protective case of FIG. 1 magnetically mounted to the folding cover, where the protective case houses an electronic device in a landscape orientation.

FIGS. 14-21 show a second version of a folding cover 300. The second version of the folding cover 300 can have differing exterior dimension compared to the first version of the folding cover shown in FIGS. 4-13. The second version of the folding cover 300 can have a unique arrangement of folding joints 365 that allow it to be folded and arranged into a variety of configurations for protecting, transporting, or displaying the electronic device 100 housed in the protective case 200. FIG. 14 shows a perspective view of the folding cover 300 that highlights the flexibility of the folding cover enabled by four folding joints 365 extending widthwise across the folding cover. FIG. 15 shows a front view of the folding cover while in a closed position. FIG. 16 shows a rear view of the folding cover in a closed configuration and wrapped around the protective case 200 which houses the electronic device 100. FIG. 17 shows a front view of the folding cover 300 in an open configuration with the protective case 200 magnetically mounted to the folding cover, where the protective case houses the electronic device 100. FIG. 18 shows a front perspective view of the folding cover 300 in a folded configuration with the protective case 200 magnetically mounted to the folding cover, where the protective case houses the electronic device 100 in a portrait orientation. FIG. 19 shows a front perspective view of the folding cover 300 in a folded configuration with the protective case 200 magnetically mounted to the folding cover, where the protective case houses the electronic device 100 in a landscape orientation. FIG. 20 shows a rear perspective view of the folding cover 300 in a folded configuration with the protective case 200 magnetically mounted to the folding cover, where the protective case houses the electronic device 100 in a portrait orientation. FIG. 21 shows a rear view of the folding cover 300 in a folded configuration and the protective case magnetically mounted to the folding cover, where the protective case houses the electronic device 100 in a landscape orientation.

As shown in FIG. 20, the folding cover 300 can be arranged such that an end segment 395 of the folding cover is tucked behind the male mounting portion 320 and against a first folding joint that is located proximate the male mounting portion. In such an example, a portion of the folding cover 300 can establish a triangular prism shape to support the protective case 200 and the electronic device 100 to permit a variety of viewing angles (e.g. 30-45 or 45-60 degrees) with respect to a horizontal plane.

Figure 22:
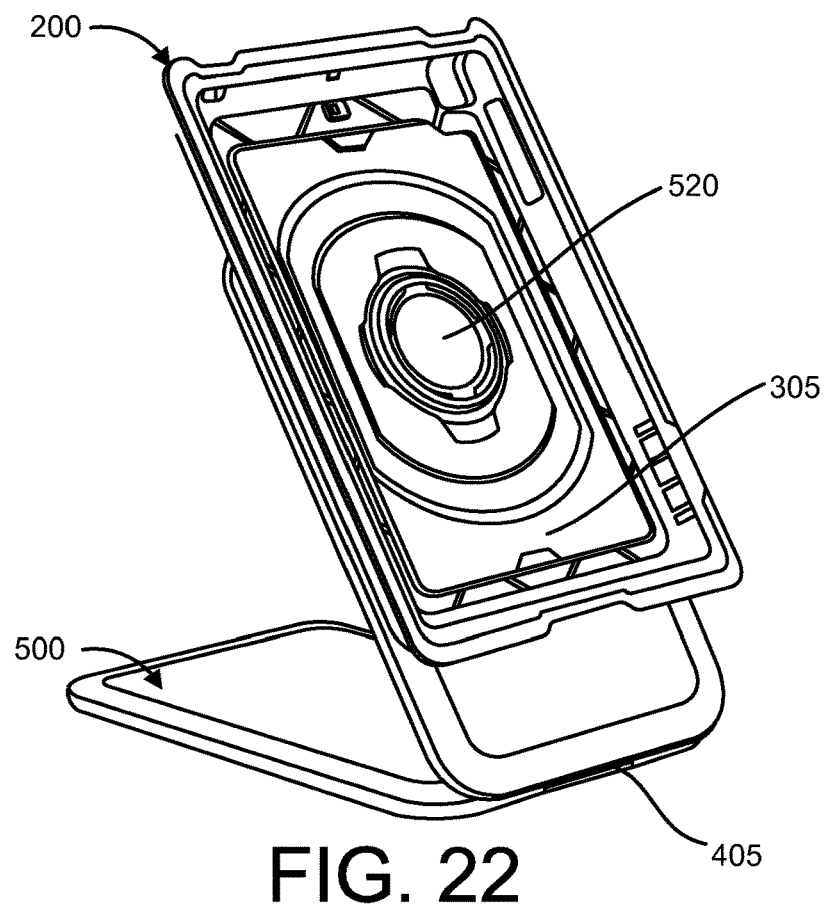
FIG. 22 shows a front perspective view of a dock and the protective case of FIG. 1 magnetically mounted to the dock.
Figure 23:
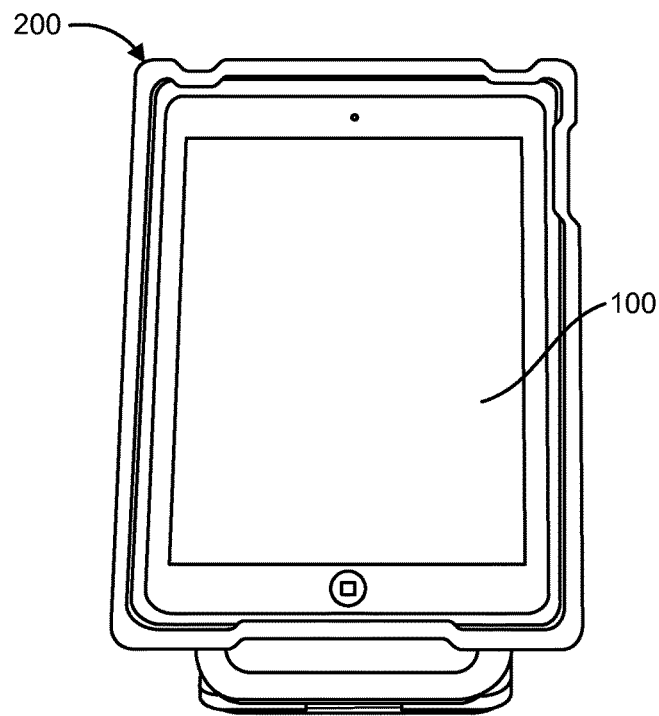
FIG. 23 shows a front view of the dock of FIG. 22 and the protective case of FIG. 1 magnetically mounted to the dock.
Figure 24:
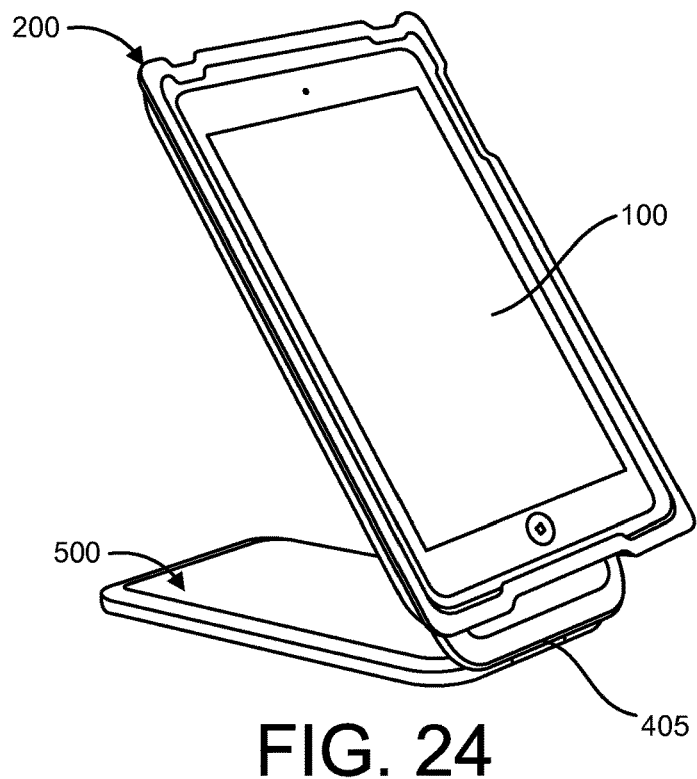
FIG. 24 shows a front perspective view of the dock of FIG. 22 and the protective case of FIG. 1 magnetically mounted to the dock, where the protective case houses an electronic device in a portrait orientation.
Figure 25:
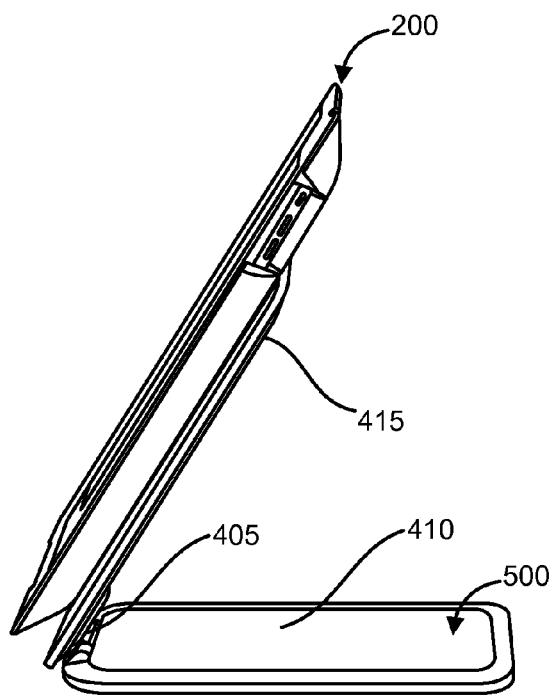
FIG. 25 shows a right side perspective view of the dock of FIG. 22 and the protective case of FIG. 1 magnetically mounted to the dock, where the protective case houses an electronic device in a portrait orientation.
Figure 26:
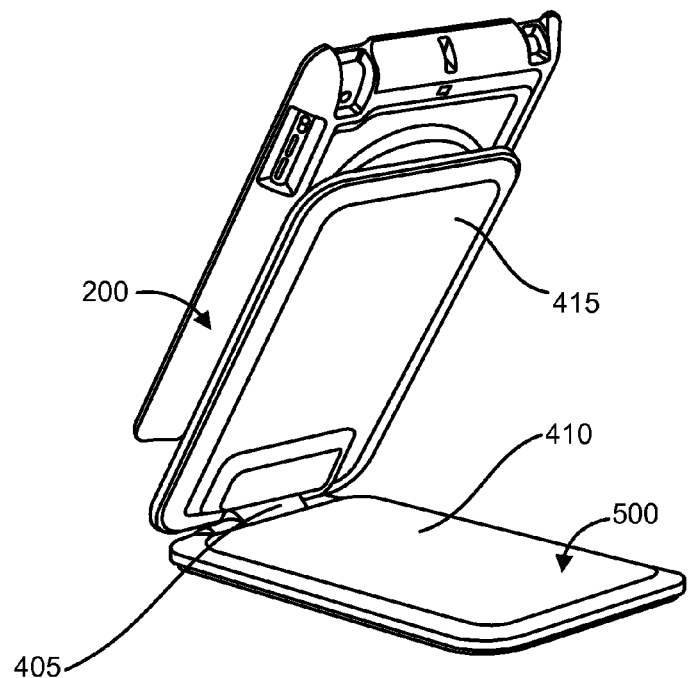
FIG. 26 shows a rear perspective view of the dock of FIG. 22 and the protective case of FIG. 1 magnetically mounted to the dock, where the protective case houses an electronic device in a portrait orientation.

FIG. 22 shows the protective case 200 (with no electronic device 100 housed in the protective case) magnetically mounted to a dock 500. The dock 500 can have a base member 410 connected to an upper member 415 by a hinged joint 405. The upper member 415 can include a male mounting portion 520 similar to the male mounting portions (e.g. 320, 410) of the folding cover 300 and surface mount 400. More specifically, the male mounting portion 520 of the dock 500 can include raised engagement portions, transition ramps, magnets, and a ferrous metal member similar to the raised engagement portions 325, transition ramps 330, magnets 350, and ferrous metal member 380 of the folding cover 300.

Figure 27:
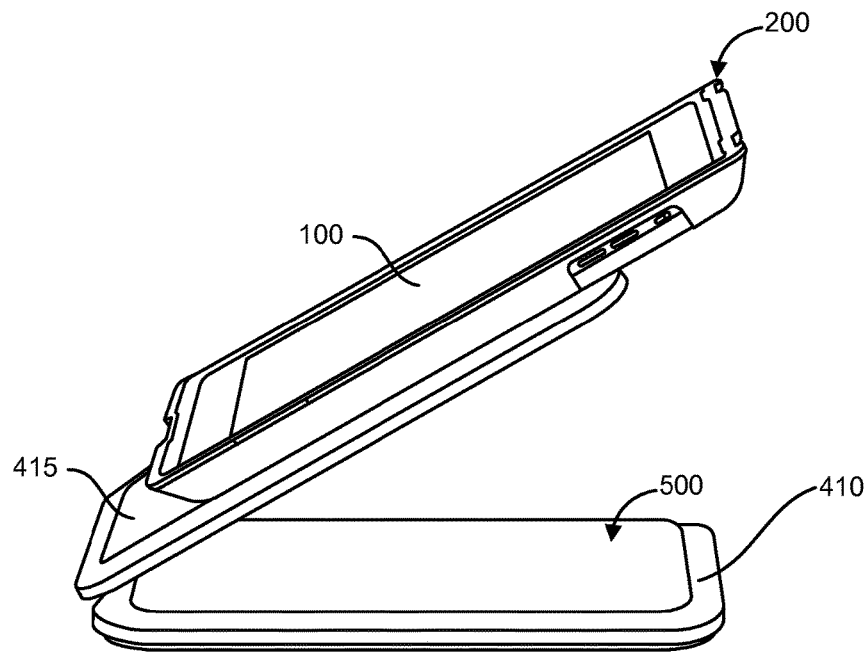
FIG. 27 shows a right side perspective view of the dock of FIG. 22 and the protective case of FIG. 1 magnetically mounted to the dock, where the protective case houses an electronic device in a portrait orientation.
Figure 28:
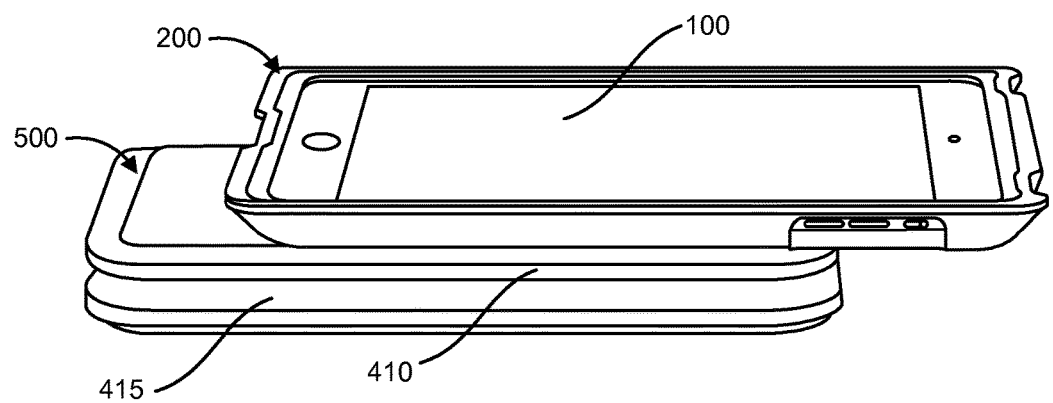
FIG. 28 shows a right side perspective view of the dock of FIG. 22 and the protective case of FIG. 1 magnetically mounted to the dock, where the protective case houses an electronic device in a portrait orientation.

The hinged joint 405 of the dock 500 can allow the dock to support the protective case 200 and electronic device 100 in a variety of viewing angles (e.g. 0-90 degrees) with respect to a horizontal plane. For instance, FIGS. 22-26 show the protective case 200 and the electronic device 100 supported at an angle of about 60 degrees, FIG. 27 shows the protective case 200 and the electronic device 100 supported at an angle of about 30 degrees, and FIG. 28 shows the protective case 200 and the electronic device 100 supported at an angle of about 0 degrees with respect to a horizontal plane.

Figure 29:
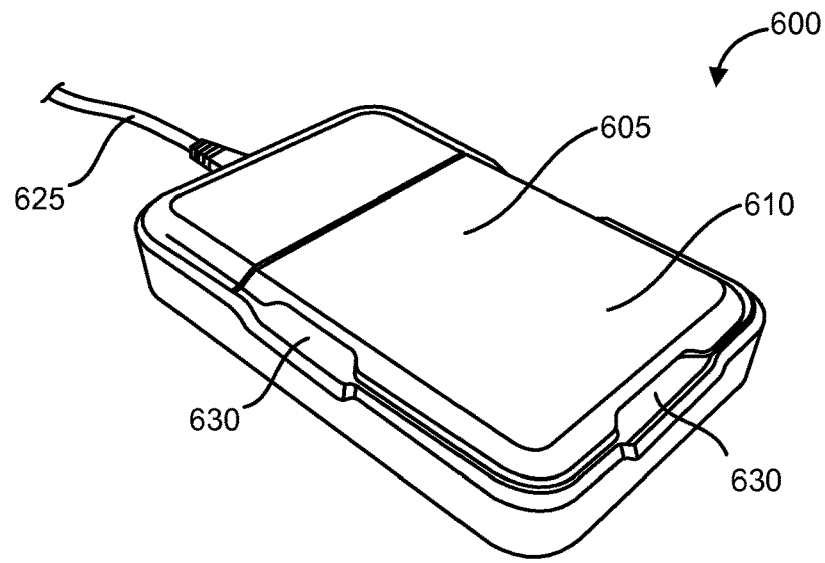
FIG. 29 shows a perspective view of a power base for the dock of FIG. 22
Figure 30:
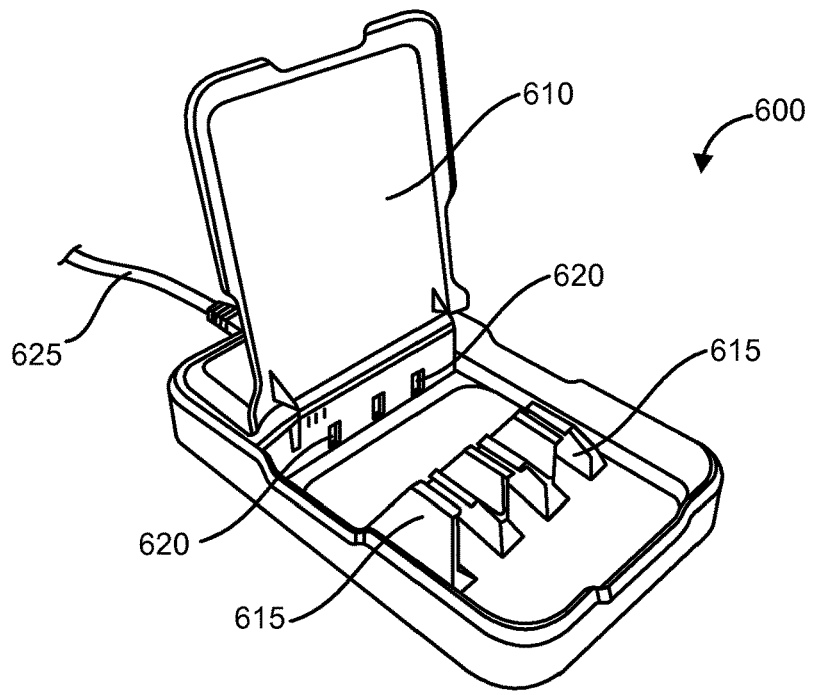
FIG. 30 shows a perspective view of the power base of FIG. 29 with a lid in an open position exposing a plurality of power connections.
Figure 31:
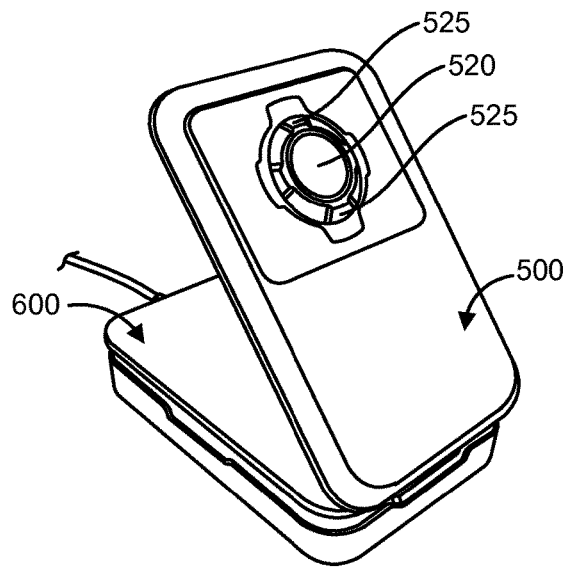
FIG. 31 shows a perspective view of the dock of FIG. 22 positioned on top of the power base of FIG. 29.

FIGS. 29-31 show a power base 600 that is compatible with the dock 500. The power base 600 is configured to support the dock 500 on a top surface 605 of the power base, as shown in FIG. 31. The power base 600 can include a lid 610 that opens to reveal one or more electrical ports 620, such as USB ports, disposed within an interior volume of the power base. The power base 600 can include a power cord 625 extending from the power base and being electrically connected to the electrical ports 620 located in the interior volume of the power base. The interior volume of the power base 600 can include one or more cord storage features 615. The cord storage features 615 can be configured to capture and store a cord, such as a USB cord, that is either not being used or is longer than needed. When the lid 610 of the power base is in a closed position, the power base 600 can include one or more gaps 630 that permit a cord, such as a USB cord, to be fed through the gap and routed to, for example, an electrical port in the electronic device 100 housed in the protective case 200, which is magnetically mounted to the dock 500, which is positioned on top of the power base.

Figure 32:
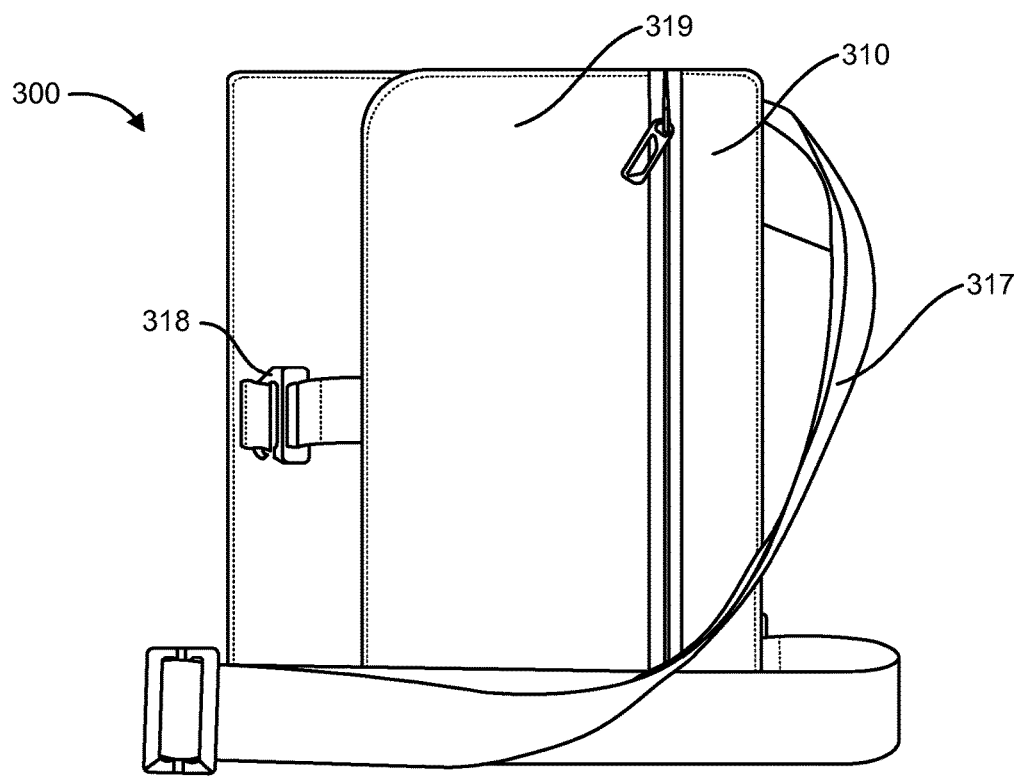
FIG. 32 shows a folding cover for an electronic device.
Figure 33:
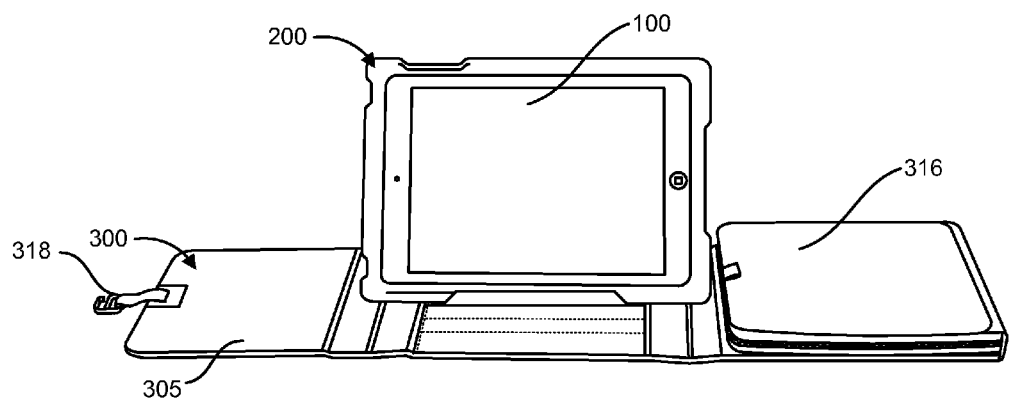
FIG. 33 shows a front perspective view of the folding cover of FIG. 32 and the protective case of FIG. 1 magnetically mounted to the folding cover, where the protective case houses an electronic device in a landscape orientation.
Figure 34:
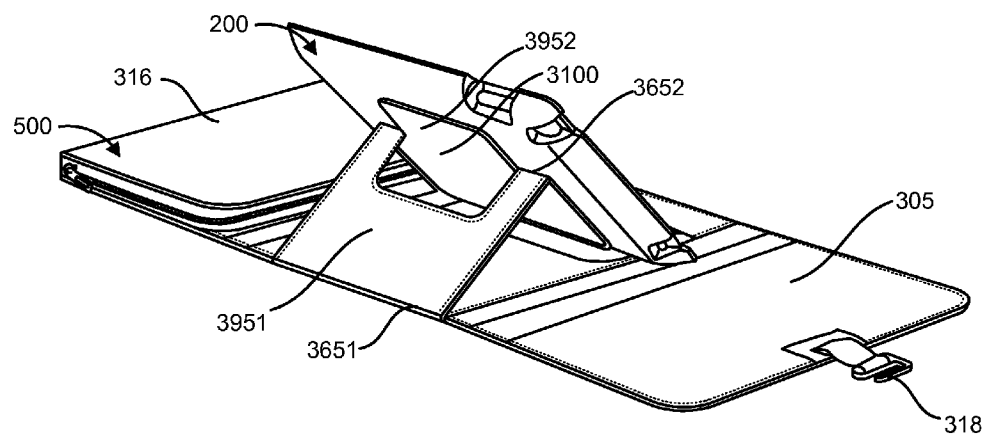
FIG. 34 shows a rear perspective view of the folding cover of FIG. 32 and the protective case of FIG. 1 magnetically mounted to the folding cover, where the protective case houses an electronic device in a landscape orientation.

FIGS. 32-34 show a third version of a folding cover 300. The third version of the folding cover 300 can have differing exterior dimensions than the first or second versions of the folding cover. The third version of the folding cover 300 can have a unique arrangement of folding joints 365 that allow it to be folded and arranged into a variety of configurations suitable for protecting, transporting, or displaying the electronic device 100 housed in the protective case 200. The folding cover 300 can include a first segment 3951 that is flexibly connected to the inner surface 305 of the folding cover by a first folding joint 3651. A second segment 3952 can be flexibly connected to the first segment 3402 by a second folding joint 3652. The second segment 3952 can include a front surface and a back surface 3100 opposite the front surface, and the male mounting portion 320 can extend from the front surface of the second segment. The male mounting portion 320 can be configured to magnetically mount to the female mounting portion 220 of the protective case, as shown in FIG. 34.

The folding cover 300 can include a first compartment 316 located on an inner surface 305 of the folding cover and a second compartment 319 located on an outer surface 310 of the folding cover. The first and second compartments can be configured to receive and store an assortment of, for example, paper or writing utensils. In the examples shown in FIGS. 32-34, the first and second compartments (316, 319) can be zippered compartments. In other examples, the first and second compartments (316, 319) can be closable with snaps, buckles, or other suitable fastening mechanisms.

The folding cover 300 can include a carrying strap 317, as shown in FIG. 32. The carrying strap 317 can have a first end attached to a first location on the folding cover 300 and a second end attached to a second location on the folding cover. The carrying strap 317 can be adjustable in length to accommodate a variety of users. The folding cover 300 can include a clasping mechanism 318 to maintain the folding cover in a closed position, as shown in FIG. 32. The clasping mechanism 318 can be any suitable clasping mechanism, such as a buckle, latch, snap, or hook and loop fastener.

In some examples, a magnetic mounting apparatus for an electronic device can include a protective case 200 and a folding cover 300. The protective case can be configured to receive and house the electronic device 100. The protective case 200 can include an inner surface 205 configured to contact a rear surface 110 of the electronic device 100 when the electronic device is housed within the protective case. The protective case 200 can include an outer surface 210 opposite the inner surface 205 and a female mounting portion 220 disposed within the outer surface of the protective case. The female mounting portion 220 can include a plurality of recesses 225. The protective case 200 can include a ferrous metal plate 230 disposed within the outer surface 210 of the protective case. The ferrous metal plate can be a steel plate having a thickness of about 0.03 to about 0.25 in. The folding cover 300 can include an inner surface 305 and an outer surface 310 and a male mounting portion 320 extending from the inner surface of the folding cover. The male mounting portion 320 can include a plurality of raised engagement portions 325 adapted to engage one or more of the plurality of recesses 225 in the female mounting portion 220 of the protective case 200. The folding cover 300 can include at least one magnet 350 disposed within the folding cover proximate the male mounting portion 320, where the at least one magnet can be configured to exert an attractive force on the ferrous metal plate 230 of the protective case 200, and the attractive force can cause each of the plurality of raised engagement portions 325 of the male mounting portion 320 of the folding cover 300 to be drawn into one of the plurality of recesses 225 in the female mounting portion 220 of the protective case 200.

In some examples, the plurality of raised engagement portions 325 can include four raised engagement portions positioned equidistant from a midpoint of the male mounting portion, and the four raised engagement portions can be arranged radially at 0, 90, 180, and 270 degrees, respectively, around the midpoint of the male mounting portion. The plurality of recesses 225 can include four recesses positioned equidistant from a midpoint of the female mounting portion 220, and the four recesses can be arranged radially at 0, 90, 180, and 270 degrees, respectively, around the midpoint of the female mounting portion.

In some examples, each of the plurality of raised engagement portions 325 can include a pair of transition ramps 235, where the pair of transition ramps on each raised engagement portion permits the female mounting portion 220 of the protective case 200 to be smoothly rotated relative to the male mounting portion 320 of the folding cover 300 in a clockwise or counterclockwise direction between a landscape mode and a portrait mode. In some examples, each of the plurality of recesses 225 can include a pair of transition ramps, where the pair of transition ramps on each recess permits the female mounting portion 220 of the protective case 200 to be smoothly rotated relative to the male mounting portion of the folding cover in a clockwise or counterclockwise direction between a landscape mode and a portrait mode.

The folding cover 300 can include a folding retention member 390 attached to the inner surface 305 of the folding cover. The folding retention member 390 can include a metal strip encased in a compliant material, such as natural or synthetic fabric. The folding cover 300 can include magnet disposed between the inner and outer surfaces of the folding cover, and the magnet can be associated with the folding retention member 390. The associated magnet can be positioned near or under the folding retention member 390 and can be configured to exert an attractive force on the folding retention member. The attractive force can cause the folding retention member 390 to remain in a flat orientation against the inner surface 305 of the folding cover 300 when the folding retention member is not being used to support the protective case.

A surface mount 400 for magnetically mounting an electronic device 100 to a surface can include a front surface and a rear surface opposite the front surface. The surface mount can include a male mounting portion 410 extending outward from the front surface of the surface mount. The male mounting portion 410 can include a plurality of raised engagement portions 415 adapted to engage a plurality of recesses 225 in a female mounting portion 220 of a protective case 200 configured to house the electronic device 100. The surface mount 400 can include a plurality of magnets 405 disposed within the surface mount. The surface mount 400 can include a ferrous metal member 480 positioned between the plurality of magnets 405 and the rear surface of the surface mount. The ferrous metal member 480 can be configured to alter the magnetic field of at least one magnet 405 in the plurality of magnets. The plurality of magnets 405 can be equally spaced in a radial configuration around the male mounting portion of the surface mount, such as at 45, 135, 225, and 315 degrees, respectively, around the male mounting portion 410 of the surface mount 400.

The plurality of magnets 405 can be adapted to exert an attractive force on a ferrous metal plate 230 of the protective case 200. The attractive force can cause each of the plurality of raised engagement portions 415 of the male mounting portion 410 of the surface mount 400 to be drawn into one of the plurality of recesses 225 in the female mounting portion 220 of the protective case 200. The plurality of raised engagement portions 415 on the male mounting portion 410 of the surface mount 400 can include four raised engagement portions positioned equidistant from a midpoint of the male mounting portion. The four raised engagement portions 415 can be arranged radially at 0, 90, 180, and 270 degrees, respectively, around the male mounting portion 410. The plurality of recesses 225 can include four recesses positioned radially at 0, 90, 180, and 270 degrees, respectively, around the female mounting portion 220.

In some examples, each of the plurality of raised engagement portions 415 can include a pair of transition ramps 420, where the pair of transition ramps on each raised engagement portion permits the female mounting portion 220 of the protective case 200 to be smoothly rotated relative to the male mounting portion 410 of the surface mount 400 in a clockwise or counterclockwise direction between a landscape mode and a portrait mode. In some examples, each of the plurality of recesses 225 can include a pair of transition ramps 235, where the pair of transition ramps on each recess permits the female mounting portion 220 of the protective case 200 to be smoothly rotated relative to the male mounting portion 410 of the surface mount 400 in a clockwise or counterclockwise direction between a landscape mode and a portrait mode.

In some examples, a protective case 200 for housing an electronic device 100 and mounting the electronic device to a surface can include an inner surface 205 configured to contact and protect a rear surface 110 of the electronic device 100 when the electronic device is housed within the protective case. The protective case 200 can include an outer surface 210 opposite the inner surface 205 and a female mounting portion 220 disposed within the outer surface of the protective case. The female mounting portion 220 can include a plurality of recesses 225 positioned equidistant and radially at 0, 90, 180, and 270 degrees, respectively, from a midpoint of the female mounting portion 220. The protective case 200 can include a ferrous metal plate 230 disposed within the outer surface 210 of the protective case. The ferrous metal plate 230 can substantially flush with the outer surface 210 of the protective case 200. The female mounting portion 220 can be configured to magnetically mount to a male mounting portion on another component, such as a folding cover 300, surface mount 400, or dock 500.

The protective case 200 can include a flexible lip 240 extending around a front perimeter of the protective case. The flexible lip 240 can be configured to flex to permit insertion of the electronic device 100 into a cavity 270 of the protective case 200 and to assist in retaining the electronic device within the protective case after insertion by snapping over a front perimeter edge of the electronic device and resting against a front surface 105 of the electronic device when the electronic device is installed in the protective case. The protective case 200 can include an interior overmolding 260 disposed on at least a portion of the inner surface 205 of the protective case. The interior overmolding 260 can be formed from an elastomeric material. The protective case 200 can include an exterior overmolding 255 disposed on at least a portion of the outer surface 210 of the protective case. The exterior overmolding can be formed from an elastomeric material. In some examples, the protective case 200 can include an opening 215 in the female mounting portion 220, and the opening can be sized to permit a user to insert at least one finger through the opening to assist with ejecting the electronic device 100 from the protective case.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A magnetic mounting apparatus for an electronic device, the magnetic mounting apparatus comprising:
 a protective case configured to receive and house the electronic device, the protective case comprising: an inner surface configured to contact a rear surface of the electronic device when the electronic device is housed within the protective case; an outer surface opposite the inner surface; a female mounting portion disposed within the outer surface of the protective case, the female mounting portion comprising a plurality of recesses; and a ferrous metal plate disposed within the outer surface of the protective case; and
 a folding cover comprising an inner surface and an outer surface; a male mounting portion extending from the inner surface of the folding cover; the male mounting portion comprising a plurality of raised engagement portions adapted to engage one or more of the plurality of recesses in the female mounting portion of the protective case; at least one magnet disposed within the folding cover proximate the male mounting portion, wherein the at least one magnet is configured to exert an attractive force on the ferrous metal plate of the protective case, the attractive force causing each of the plurality of raised engagement portions of the male mounting portion of the folding cover to be drawn into one of the plurality of recesses in the female mounting portion of the protective case.

2. The magnetic mounting apparatus of claim 1, wherein the plurality of raised engagement portions comprises four raised engagement portions positioned equidistant from a midpoint of the male mounting portion, the four raised engagement portions arranged radially at 0 degrees, 90 degrees, 180 degrees, and 270 degrees, respectively, around the midpoint of the male mounting portion.

3. The magnetic mounting apparatus of claim 2, wherein the plurality of recesses comprises four recesses positioned equidistant from a midpoint of the female mounting portion, the four recesses arranged radially at 0 degrees, 90 degrees, 180 degrees, and 270 degrees, respectively, around the midpoint of the female mounting portion.

4. The magnetic mounting apparatus of claim 3, wherein each of the plurality of raised engagement portions comprises a pair of transition ramps, wherein the pair of transition ramps on each raised engagement portion permits the female mounting portion of the protective case to be smoothly rotated relative to the male mounting portion of the folding cover in a clockwise or counterclockwise direction between a landscape mode and a portrait mode.

5. The magnetic mounting apparatus of claim 3, wherein each of the plurality of recesses comprises a pair of transition ramps, wherein the pair of transition ramps on each recess permits the female mounting portion of the protective case to be smoothly rotated relative to the male mounting portion of the folding cover in a clockwise or counterclockwise direction between a landscape mode and a portrait mode.

6. The magnetic mounting apparatus of claim 1, the folding cover further comprising:
a folding retention member attached to the inner surface of the folding cover, the folding retention member comprising a metal strip encased in a compliant material; and
an associated magnet disposed between the inner and outer surfaces of the folding cover, the associated magnet positioned near the folding retention member and configured to exert an attractive force on the folding retention member, the attractive force causing the folding retention member to remain in a flat orientation against the inner surface of the folding cover when the folding retention member is not being used to support the protective case.

7. The magnetic mounting apparatus of claim 1, wherein the ferrous metal plate is a steel plate having a thickness of about 0.03 in. to about 0.25 in.

8. The magnetic mounting apparatus of claim 1, wherein the at least one magnet is positioned between the inner surface and the outer surface of the folding cover.

9. The magnetic mounting apparatus of claim 1, wherein the folding cover includes one or more folding joints that permit the folding cover to be configured into a variety of shapes.

10. The magnetic mounting apparatus of claim 1, wherein the at least one magnet comprises four magnets equally spaced around the male mounting portion.

11. The magnetic mounting apparatus of claim 10, wherein the four magnets are positioned radially at 45 degrees, 135 degrees, 225 degrees, and 315 degrees, respectively, around the midpoint of the male mounting portion.

12. The magnetic mounting apparatus of claim 1, wherein the folding cover includes a keyboard configured to permit a user to interact with the electronic device when the electronic device is housed within the protective case.

13. The magnetic mounting apparatus of claim 1, wherein the folding cover includes a switch magnet configured to actuate a switch of the electronic device when the electronic device is housed within the protective case.

14. The magnetic mounting apparatus of claim 1, wherein the folding cover includes one or more folding retention members to stabilize the protective case against the folding cover.

15. A protective case for housing an electronic device and mounting the electronic device to a surface, the protective case comprising:
an inner surface configured to contact and protect a rear surface of the electronic device when the electronic device is housed within the protective case; an outer surface opposite the inner surface; a female mounting portion disposed within the outer surface of the protective case, the female mounting portion comprising a plurality of recesses positioned equidistant and radially at 0 degrees, 90 degrees, 180 degrees, and 270 degrees, respectively, from a midpoint of the female mounting portion; and a ferrous metal plate disposed within the outer surface of the protective case; and
a folding cover including a male mounting portion extending from an inner surface of the folding cover, the male mounting portion comprising at least one magnet configured to exert an attractive force on the ferrous metal plate of the protective case, the attractive force causing the male mounting portion to be drawn into the plurality of recesses of the female mounting portion of the protective case.

16. The protective case of claim 15, further comprising a flexible lip extending around a front perimeter of the protective case, the flexible lip configured to flex to permit insertion of the electronic device into a cavity of the protective case and to assist in retaining the electronic device within the protective case after insertion by snapping over a front perimeter edge of the electronic device and resting against a front surface of the electronic device when the electronic device is installed in the protective case.

17. The protective case of claim 15, further comprising an interior overmolding disposed on at least a portion of the inner surface of the protective case, the interior overmolding formed from an elastomeric material.

18. The protective case of claim 15, further comprising an exterior overmolding disposed on at least a portion of the outer surface of the protective case, the exterior overmolding formed from an elastomeric material.

19. The protective case of claim 15, wherein the ferrous metal plate disposed within the outer surface of the protective case is positioned to be substantially flush with the outer surface of the protective case.

20. The protective case of claim 15, further comprising an opening in the female mounting portion, the opening being sized to permit a user to insert at least one finger through the opening to assist with ejecting the electronic device from the protective case.

* * * * *